(12) United States Patent  
Kim

(10) Patent No.: US 11,470,499 B2
(45) Date of Patent: Oct. 11, 2022

(54) METHOD AND DEVICE FOR PROCESSING DATA IN WIRELESS COMMUNICATION SYSTEM

(71) Applicant: Samsung Electronics Co., Ltd., Suwon-si (KR)

(72) Inventor: Dong Gun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 16/762,698

(22) PCT Filed: Nov. 8, 2018

(86) PCT No.: PCT/KR2018/013535
§ 371 (c)(1),
(2) Date: May 8, 2020

(87) PCT Pub. No.: WO2019/093784
PCT Pub. Date: May 16, 2019

(65) Prior Publication Data
US 2021/0176661 A1    Jun. 10, 2021

(30) Foreign Application Priority Data
Nov. 10, 2017    (KR) .................. 10-2017-0149798

(51) Int. Cl.
*H04W 28/02*    (2009.01)
*H04W 72/04*    (2009.01)

(52) U.S. Cl.
CPC ... *H04W 28/0278* (2013.01); *H04W 72/0486* (2013.01)

(58) Field of Classification Search
None
See application file for complete search history.

(56) References Cited

U.S. PATENT DOCUMENTS

2011/0310937 A1* 12/2011 Lin .................. H04W 28/0278
                                                        375/219
2012/0069805 A1*  3/2012 Feuersanger ..... H04W 72/1284
                                                        370/329

(Continued)

FOREIGN PATENT DOCUMENTS

KR    10-2017-0089097 A    8/2017

OTHER PUBLICATIONS

KT Corp.; Discussion on NR BSR formats; 3GPP TSG-RAN WG2 #99bis; R2-1710900; Oct. 9-13, 2017; Prague, Czech Republic.

(Continued)

*Primary Examiner* — Phirin Sam
(74) *Attorney, Agent, or Firm* — Jefferson IP Law, LLP

(57) ABSTRACT

Provided is a method, performed by a user equipment (UE), of processing data in a wireless communication system, the method including: determining a format for buffer status report based on a buffer status of each of logical channel groups when the UE receiving an uplink transmission resource from a base station determines to report the buffer status to the base station; allocating, to each of the logical channel groups, a transmission resource remaining after excluding, from the uplink transmission resource, a transmission resource used for reporting the buffer status of the determined format; and re-determining the format for the buffer status report based on the buffer status of each of the logical channel groups after the allocating.

13 Claims, 25 Drawing Sheets

(56) References Cited

U.S. PATENT DOCUMENTS

| | | | |
|---|---|---|---|
| 2015/0181461 A1* | 6/2015 | Kim | H04W 28/0289 370/236 |
| 2015/0296534 A1* | 10/2015 | Han | H04W 28/0278 455/436 |
| 2016/0227433 A1* | 8/2016 | Lee | H04W 28/0278 |
| 2017/0019812 A1* | 1/2017 | Lee | H04W 28/0278 |
| 2017/0310531 A1* | 10/2017 | Dinan | H04W 56/0005 |
| 2018/0049227 A1* | 2/2018 | Moon | H04W 72/1284 |
| 2018/0206260 A1* | 7/2018 | Khoryaev | H04W 72/1284 |
| 2019/0335357 A1* | 10/2019 | Shi | H04W 72/1284 |
| 2020/0163122 A1* | 5/2020 | Lee | H04W 72/1268 |
| 2020/0236583 A1* | 7/2020 | Tang | H04W 72/1284 |

OTHER PUBLICATIONS

Huawei; Design of BSR format and BS table; 3GPP TSG-RAN WG2 #99bis; R2-1710202; Oct. 9-13, 2017; Prague, Czech Republic.

Ericsson; BSR Text proposal; 3GPP TSG-RAN WG2 #99bis Tdoc; R2-1711185; Oct. 9-13, 2017; Prague, Czech Republic.

OPPO; Discussion on the BSR format; 3GPP TSG RAN WG2 #99-Bis; R2-1710352; Oct. 9-13, 2017; Prague, Czech Republic.

CATT; BSR MAC CE; 3GPP TSG-RAN WG2 #99bis; R2-1710298; Oct. 9-13, 2017; Prague, Czech Republic.

International Search Report with English translation dated Feb. 25, 2019; International Appln. No. PCT/KR2018/013535.

ZTE; BSR reporting scheme; 3GPP TSG RAN WG2 #70; R2-102816; XP050423153; May 10-14, 2010; Montreal, Canada.

Intel Corporation; BSR enhancements; 3GPP TSG RAN WG2 Meeting #99bis; R2-1710606; revision R2-1708790; XP051355034; Oct. 9-13, 2017; Prague, Czech Republic.

Samsung; Corrections on BSR: 6.1.1.02; 3GPP TSG-RAN WG2#63; R2-084497; XP050319546; Aug. 18-22, 2018; Jeju Island, KR.

European Search Report dated Nov. 10, 2020; European Appln. No. 18875511.0-1215/3709703 PCT/KR2018013535.

European Office Action dated Mar. 3, 2022 for European Appln. No. 18 875 511.0-1215.

Korean Office Action with English translation dated Jun. 20, 2022; Korean Appln. No. 10-2017-0149798.

* cited by examiner

METHOD AND DEVICE FOR PROCESSING DATA IN WIRELESS COMMUNICATION SYSTEM

TECHNICAL FIELD

Embodiments described herein relate to a wireless communication system, and more particularly, to a data processing method and device for efficiently configuring data in a wireless communication system.

BACKGROUND ART

To meet the increase in demand for wireless data traffic after the commercialization of 4th Generation (4G) communication systems, considerable efforts have been made to develop improved 5th Generation (5G) communication systems or pre-5G communication systems. For this reason, 5G communication systems or pre-5G communication systems are called beyond 4G network communication systems or post Long Term Evolution (LTE) systems. To achieve a high data rate, the implementation of 5G communication systems in an ultra-high frequency millimeter wave (mmWave) band (e.g., a 60 GHz band) is under consideration. To alleviate propagation path loss of radio waves and increase propagation distances of radio waves in an ultra-high frequency band, technologies for 5G communication systems, such as beamforming, massive multiple input multiple output (MIMO), full dimensional MIMO (FD-MIMO), array antenna, analog beamforming, and large-scale antenna technologies are discussed. Also, in order to improve a system network for 5G communication systems, the development of techniques, such as evolved small cell, advanced small cell, cloud radio access network (cloud RAN), ultra-dense network, Device-to-Device (D2D) communication, wireless backhaul, moving network, cooperative communication, Coordinated Multi-Points (COMP), and reception interference cancellation, has been conducted. In addition, for 5G communication systems, hybrid Frequency Shift Keying (FSK) and Quadrature Amplitude Modulation (QAM) (FQAM) and Sliding Window Superposition Coding (SWSC), which are Advanced Coding Modulation (ACM) schemes; and Filter Bank Multi-Carrier (FBMC), Non-Orthogonal Multiple Access (NOMA), and Sparse Code Multiple Access (SCMA), which are advanced access techniques, have been developed.

The Internet has evolved from a human-centered connection network, through which a human generates and consumes information, to an Internet of Things (IoT) network that exchanges and processes information between distributed elements such as objects. Internet of Everything (IoE) technology is emerging, in which technology related to the IoT is combined with, for example, technology for processing big data through connection with a cloud server. In order to implement the IoT, various technical components are required, such as a sensing technique, wired/wireless communication and network infrastructures, a service interfacing technique, a security technique, etc. In recent years, techniques including a sensor network for connecting objects, Machine-to-Machine (M2M) communication, Machine Type Communication (MTC), etc., have been studied. In the IoT environment, intelligent Internet Technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technology including beamforming, MIMO, array antennas, etc. The application of cloud RAN as a big data processing technique described above may be an example of convergence of 5G communication technology and IoT technology.

As one of many technologies for meeting the increasing demand for large-capacity communication, a method of providing multiple connections has been proposed. For example, a carrier aggregation (CA) technology of an LTE system may provide multiple connections through multiple carriers. Therefore, users may be provided with services through more resources. Also, various services including broadcast services such as Multimedia Broadcast/Multicast Service (MBMS) may be provided through the LTE system.

DESCRIPTION OF EMBODIMENTS

Technical Problem

Embodiments described herein provide a data processing method and device for providing more effective data configuration based on allocated resources when an uplink transmission resource is allocated to a user equipment (UE) in a wireless communication system.

Solution to Problem

Provided is a method, performed by a user equipment (UE), of processing data in a wireless communication system, the method including: determining a format for buffer status report based on a buffer status of each of logical channel groups when the UE receiving an uplink transmission resource from a base station determines to report a buffer status to the base station; allocating, to each of the logical channel groups, a transmission resource remaining after excluding a transmission resource used for reporting the buffer status of the determined format from the uplink transmission resource; and re-determining the format for the buffer status report based on the buffer status of each of the logical channel groups after the allocating.

Advantageous Effects of Disclosure

Embodiments described herein propose a data processing method and device capable of efficiently configuring data in a wireless communication system, thereby increasing a data processing speed at a transmitting end, enabling transmission resources to be efficiently used, and increasing a data processing speed at a receiving end.

BEST MODE

Figure 1:
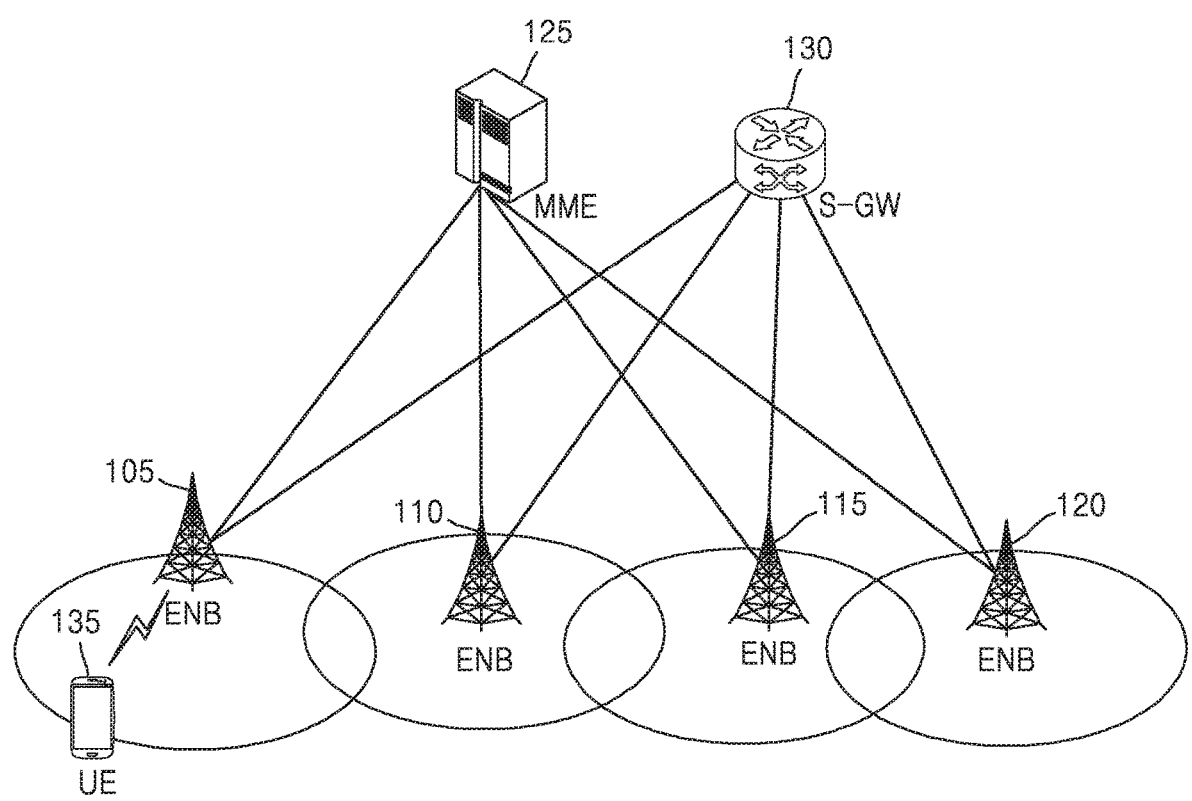
FIG. 1 is a diagram illustrating a structure of a Long-Term Evolution (LTE) system to which an embodiment is applicable.

According to an embodiment, a method, performed by a user equipment (UE), of processing data in a wireless communication system may include: determining a format for buffer status report based on a buffer status of each of logical channel groups when the UE receiving an uplink transmission resource from a base station determines to report the buffer status to the base station; allocating, to each of the logical channel groups, a transmission resource remaining after excluding, from the uplink transmission resource, a transmission resource used for reporting the buffer status of the determined format; and re-determining the format for the buffer status report based on the buffer status of each of the logical channel groups after the allocating.

The re-determining may include re-determining a packet format so as to include identification information about a logical channel group in which data remains after the allocating and information about a size of the remaining data.

The method may further include: filling the transmission resource allocated to each of logical channels with non-segmented data; and when a size of the allocated transmission resource is less than a size of data of a logical channel, determining whether to segment remaining data based on a result of comparing a transmission resource remaining after data is filled without separation with and a preset data size.

The determining of whether to segment the remaining data may include: determining to segment the remaining data when the size of the remaining transmission resource is greater than the preset data size; performing padding on the remaining resource when the size of the remaining transmission resource is less than or equal to the preset data size.

The method may further include: determining whether to segment data and a size of a remaining or insufficient resource based on a transmission resource allocated for each logical channel and a buffer status of a logical channel; re-determining whether to segment data by filling the uplink transmission resource with non-segmented data and allocating the remaining resource to a logical channel having insufficient resources; and generating a medium access control (MAC) packet data unit (PDU) including the non-segmented data and the data segmented according to the re-determining.

The re-direction of whether to segment the data may include preferentially allocating the remaining resource to a logical channel having the smallest size of the insufficient resource when there are a plurality of logical channels having insufficient resources.

The MAC PDU generated as a result of allocating the uplink transmission resource to each of a plurality of logical channels may have a configuration in which non-segmented data and segmented data are sequentially arranged with respect to data of the plurality of logical channels.

The method may further include: identifying data having insufficient transmission resources based on transmission resources allocated for each logical channel and a buffer status of a logical channel; determining whether to segment the identified data by comparing the identified data with a preset data size; and generating the MAC PDU in which the resources allocated for each logical channel are sequentially configured with non-segmented data and segmented data.

The MAC PDU generated as a result of allocating the uplink transmission resource to each of a plurality of logical channels may have a configuration in which non-segmented data and segmented data are sequentially arranged for each resource allocated to each logical channel.

According to an embodiment, a user equipment (UE) for processing data in a wireless communication system may include: a transceiver configured to receive an uplink transmission resource from a base station; at least one processor configured to determine a format for buffer status report based on a buffer status of each of logical channel groups when the UE determines to report the buffer status to the base station, allocate, to each of the logical channel groups, a transmission resource remaining after excluding, from the uplink transmission resource, a transmission resource used for reporting the buffer status of the determined format, and re-determine the format for the buffer status report based on the buffer status of each of the logical channel groups after the allocating; and a storage configured to store information about the buffer status of each of the logical channel groups.

MODE OF DISCLOSURE

Hereinafter, an operation principle of the present disclosure will be described in detail with reference to the accompanying drawings. In describing the present disclosure, when the detailed description of the relevant known functions or configurations is determined to unnecessarily obscure the gist of the present disclosure, the detailed description thereof may be omitted. The terms as used herein are those defined by taking into account functions in the present disclosure, but the terms may vary according to the intention of users or those of ordinary skill in the art, precedents, or the like. Therefore, the definitions should be made based on the contents throughout the specification.

Hereinafter, embodiments of the present disclosure will be described with reference to the accompanying drawings.

The terms for identifying access nodes, the terms referring to network entities, the terms referring to messages, the terms referring to an interface between network entities, the terms referring to a variety of identification information, and the like as used herein are provided as an example for convenience of description. Therefore, the present disclosure is not limited by the terms used herein, and other terms referring to entities having equivalent technical meanings may be used.

For convenience of description, terms and names defined in the 3rd Generation Partnership Project Long-Term Evolution (3GPP LTE) standard may be used. However, the present disclosure is not limited by the terms and names and may be equally applied to systems conforming to other standards.

FIG. 1 is a diagram illustrating a structure of a Long-Term Evolution (LTE) system to which an embodiment is applicable.

Referring to FIG. 1, a radio access network of the LTE system may include a next-generation base station (Evolved Node B) (hereinafter referred to as ENB, Node B, or BS) 105, 110, 115, and 120, a mobility management entity (MME) 125, and a serving-gateway (S-GW) 130. A user equipment (hereinafter referred to as a UE or a terminal) 135 may access an external network through the ENBs 105 to 120 and the S-GW 130.

In FIG. 1, the ENBs 105 to 120 correspond to existing Node Bs of a universal mobile telecommunications system (UMTS). The ENB may be connected to the UE 135 through a radio channel and may perform a more complicated role than the existing Node B. In the LTE system, because all user traffics, including real-time services such as Voice over IP (VoIP) through an Internet protocol, are serviced through a shared channel, an apparatus for performing scheduling by collecting state information such as buffer status of UEs, available transmission power states, and channel states is required. These operations may be performed by the ENBs 105 to 120. One ENB may usually control a plurality of cells. For example, in order to implement a transmission rate of 100 Mbps, the LTE system may use orthogonal frequency division multiplexing (OFDM) in a 20-MHz bandwidth as a radio access technology. Also, the LTE system may apply an adaptive modulation & coding (hereinafter referred to as AMC) method of determining a modulation scheme and a channel coding rate according to a channel state of a UE. The S-GW 130 is a device for providing a data bearer and may generate or remove the data bearer under the control of the MME 125. The MME 125 is a device that is responsible for various control functions as well as a mobility management function for a UE and may be connected to a plurality of base stations.

Figure 2:
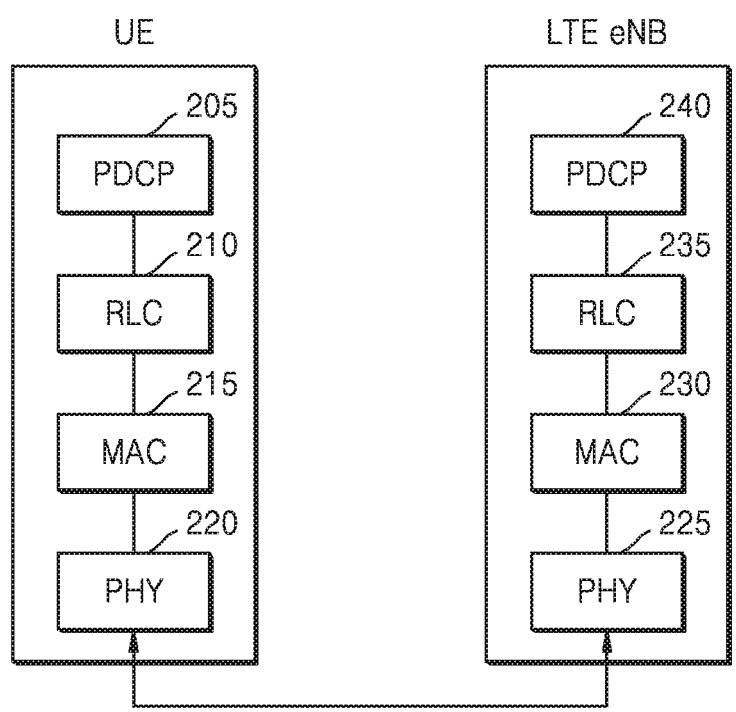
FIG. 2 is a diagram illustrating a radio protocol structure in the LTE system to which an embodiment is applicable.

FIG. 2 is a diagram illustrating a radio protocol structure in the LTE system to which an embodiment is applicable.

Referring to FIG. 2, in the radio protocol of the LTE system, the UE and the ENB may include packet data convergence protocols (PDCPs) 205 and 240, radio link controls (RLCs) 210 and 235, medium access controls (MACs) 215 and 230, and PHYs 220 and 225, respectively. The PDCPs 205 and 240 are responsible for operations such as IP header compression and decompression. The main functions of the PDCP are summarized as follows.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link controls (hereinafter referred to as RLCs) 210 and 235 may perform an ARQ operation by reconfiguring the PDCP packet data unit (PDU) to an appropriate size. The main functions of the RLC are summarized as follows.

Transfer of upper layer PDUs
ARQ function (Error Correction through ARQ (only for AM data transfer))
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 215 and 230 may be connected to a plurality of RLC layers constituted in one UE and may perform operations of multiplexing RLC PDUs into a MAC PDU and demultiplexing RLC PDUs from a MAC PDU. The main functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling MBMS service identification
Transport format selection
Padding The PHYs 220 and 225 may perform an operation of channel-coding and modulating upper layer data, making the channel-coded and modulated upper layer data into OFDM symbols, and transmitting the OFDM symbols through a radio channel, or may perform an operation of demodulating and channel-decoding OFDM symbols received through a radio channel and transmitting the demodulated and channel-decoded OFDM symbols to an upper layer.

Figure 3:
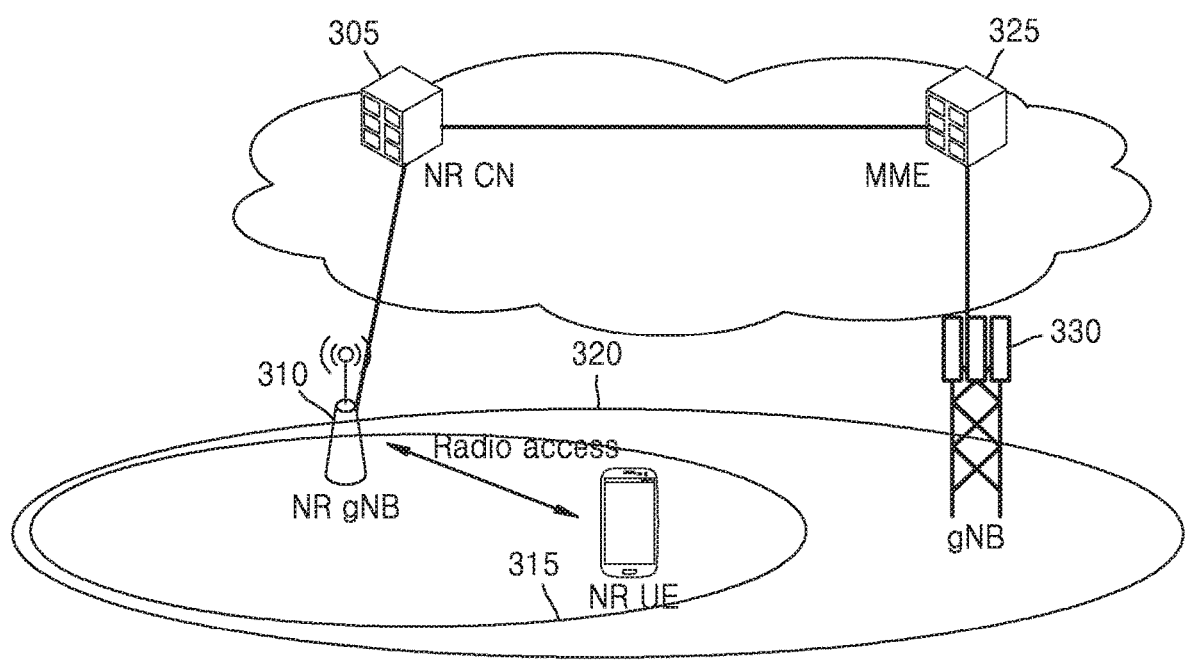
FIG. 3 is a diagram illustrating a structure of a next-generation mobile communication system to which an embodiment is applicable.

FIG. 3 is a diagram illustrating a structure of a next-generation mobile communication system to which an embodiment is applicable.

Referring to FIG. 3, a radio access network of the next-generation mobile communication system (hereinafter referred to as NR or 5G) may include a next-generation base station (New Radio Node B, NR gNB, or NR BS) 310 and a New Radio core network (NR CN) 305. A UE (New Radio user equipment, hereinafter, an NR UE or a terminal) 315 may be connected to an external network through the NR gNB 310 and the NR CN 305.

In FIG. 3, the NR gNB 310 may correspond to an evolved node B (eNB) of an existing LTE system. The NR gNB may be connected to the NR UE 315 through a radio channel and may provide superior services than the existing Node B. In the next-generation mobile communication system, because all user traffics are serviced through a shared channel, an apparatus for performing scheduling by collecting state information such as buffer status of UEs, available transmission power states, and channel states is required. These operations may be performed the NR NB 310. One NR gNB may control a plurality of cells.

In order to implement ultra-high data transmission compared with the current LTE, more than the existing maximum bandwidth may be given, and a beamforming technology may be additionally grafted by using OFDM as a radio access technology. Also, an AMC method of determining a modulation scheme and a channel coding rate according to a channel state of a UE may be applied. The NR CN 305 may perform functions such as mobility support, bearer configuration, and QoS configuration. The NR CN 305 is a device that is responsible for various control functions as well as a mobility management function for a UE and may be connected to a plurality of base stations. Also, the next-generation mobile communication system may interwork with the existing LTE system, and the NR CN 305 may be connected to the MME 325 through a network interface. The MME may be connected to the existing base station, that is, the eNB (330).

Figure 4:
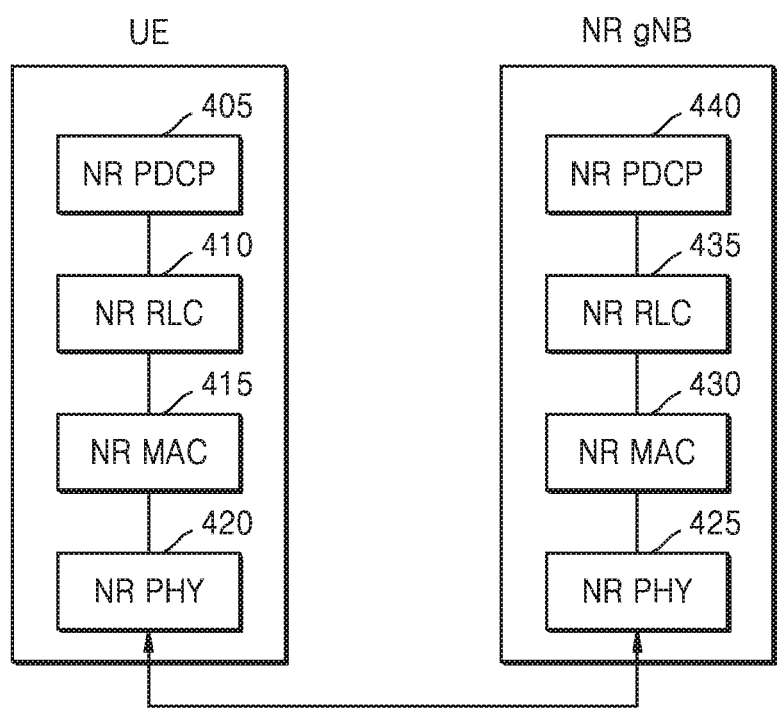
FIG. 4 is a diagram illustrating a radio protocol structure in the next-generation mobile communication system to which the present disclosure is applicable.

FIG. 4 is a diagram illustrating a radio protocol structure in the next-generation mobile communication system to which the present disclosure is applicable.

Referring to FIG. 4, in the radio protocol of the next-generation mobile communication system, a UE and an NR gNB may include NR PDCPs 405 and 440, NR RLCs 410 and 435, NR MACs 415 and 430, and NR PHYs 420 and 425, respectively.

The main functions of the NR PDCPs 405 and 440 may include some of the following functions.
Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device indicates a function of reordering PDCP PDUs received from a lower layer in sequence based on a PDCP sequence number (SN) and may include at least one of a function of delivering data to an upper layer in the reordered sequence, a function of reordering the sequence to record lost PDCP PDUs, a function of reporting the states of the lost PDCP PDUs to a transmitting side, and a function of requesting retransmission of the lost PDCP PDUs.

The main functions of the NR RLCs 410 and 435 may include some of the following functions.
Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery of the NR RLC layer indicates a function of sequentially delivering RLC service data units (SDUs) received from a lower layer to an upper layer. When one RLC SDU is received in a state of being segmented into a plurality of RLC SDUs, the in-sequence delivery may include a function of reassembling and delivering the RLC SDUs. Also, the in-sequence delivery may include at least one of a function of reordering the received RLC PDUs based on an RLC SN or a PDCP SN, a function of reordering the sequence to record lost RLC PDUs, and a function of reporting the states of the lost RLC PDUs to a transmitting side. Also, the in-sequence delivery may include a function of requesting retransmission of lost RLC PDUs. When there is a lost RLC SDU, the in-sequence delivery may include a function of sequentially delivering only RLC SDUs until before the lost RLC SDU. Also, the in-sequence delivery may include a function of sequentially delivering, to an upper layer, all RLC SDUs received before the timer starts when a certain timer expires even when there is a lost RLC SDU. Alternatively, the in-sequence delivery may include a function of sequentially delivering, to an upper layer, all RLC SDUs received till now when a certain timer expires even when there is a lost RLC SDU.

Also, the NR RLC layer may process the RLC PDUs in the order of reception (in the order of arrival, regardless of the order of serial number and sequence number) and may deliver the processed RLC PDUs to the PDCP device in any order (out-of sequence delivery). In the case of segments, segments that are stored in a buffer or are to be received later may be received and reconfigured into an intact RLC PDU, processed, and then delivered to the PDCP device. The NR RLC layer may not include the concatenation. The concatenation may be performed in the NR MAC layer or may be replaced with a multiplexing function of the NR MAC layer.

The out-of-sequence delivery of the NR RLC layer may indicate a function of directly delivering, to an upper layer, RLC SDUs received from a lower layer, regardless of the order. When one RLC SDU is received in a state of being segmented into a plurality of RLC SDUs, the out-of-sequence delivery may include a function of reassembling and delivering the received RLC SDUs. Also, the out-of-sequence delivery may include a function of storing and ordering the RLC SN or the PDCP SN of the received RLC PDUs to record the lost RLC PDUs.

The NR MACs 415 and 430 may be connected to a plurality of NR RLC layers constituted in one UE. The main functions of the NR MAC may include at least some of the following functions.

- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding The NR PHY layers 420 and 425 may channel-code and modulate upper layer data, make the channel-coded and modulated upper layer data into OFDM symbols, and transmit the OFDM symbols through the radio channel. Also, the NR PHY layers 420 and 425 may perform an operation of demodulating and channel-decoding OFDM symbols received through the radio channel and transmitting the demodulated and channel-decoded OFDM symbols to an upper layer.

Figure 5:
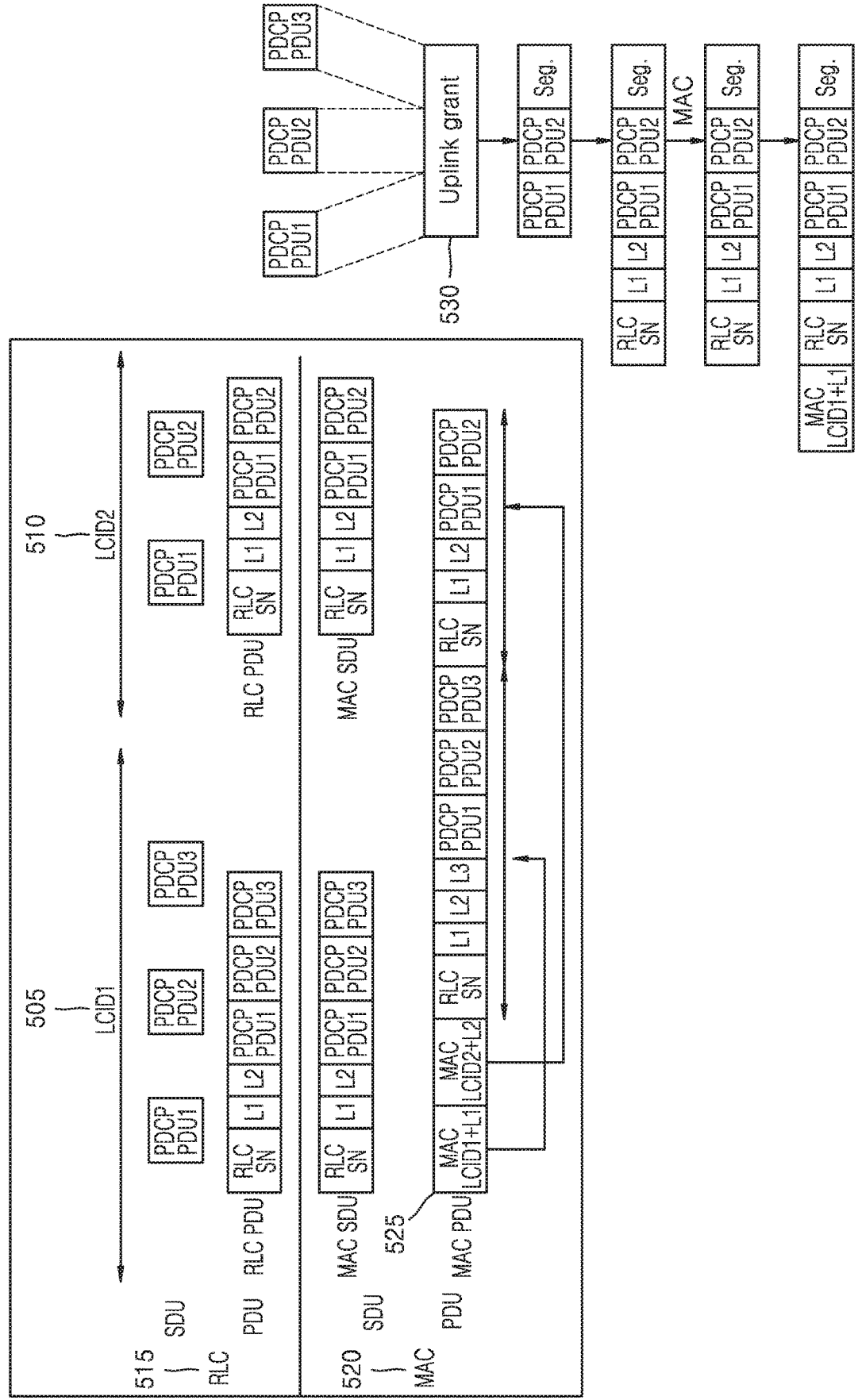
FIG. 5 is a diagram illustrating a structure for processing data in the LTE system.

FIG. 5 is a diagram illustrating a structure for processing data in the LTE system.

As illustrated in FIG. 5, the LTE system may perform RLC layer data processing with the PDCP layer for each logical channel. That is, a logical channel 1 (LCID1) 505 and a logical channel 2 (LCID2) 510 may have different PDCP layers and RLC layers and may perform independent data processing. An RLC PDU generated from the RLC layer of each logical channel may be delivered to a MAC layer, configured as one MAC PDU, and then transmitted to a receiving end. In the LTE system, the PDCP layer, the RLC layer, and the MAC layer may include the functions described with reference to FIG. 5 and may perform the corresponding operations.

The LTE system may be characterized in that the PDCP PDU is concatenated to the RLC layer. Also, like a MAC PDU structure 525 illustrated in FIG. 5, the LTE system may have a structure in which all MAC sub-headers are located at the front, and the MAC SDU part is located at the rear of the MAC PDU. Due to the above-described features, the LTE system may not perform or prepare for data processing in advance in the RLC layer before receiving an uplink transmission resource (uplink grant).

As illustrated in FIG. 5, when the uplink transmission resource 530 is received, the UE may generate an RLC PDU by concatenating PDLC PDUs received from the PDCP layer according to the uplink transmission resource. The UE may receive the uplink transmission resource from the base station in the MAC layer, perform logical channel prioritization (LCP) thereon, and allocate the uplink transmission resource for each logical channel. That is, the uplink transmission resource 530 may be an uplink transmission resource allocated from the MAC layer. When the size of the PDCP PDUs to be concatenated does not match the uplink transmission resource, the RLC layer may perform a segmentation procedure so that the PDCP PDUs match the uplink transmission resource. The segmentation procedure may be performed for each logical channel. Each RLC layer may construct an RLC header by using the concatenated PDCP PDUs and transmit the completed RLC PDU to the MAC layer. The MAC layer may configure RLC PDUs (MAC SDUs) received from each RLC layer as one MAC PDU and transmit the MAC PDU to the PHY layer. When configuring the RLC header, in a case in which the RLC layer performs segmentation to include segmented information in the header, length information about each concatenated PDCP PDU may be included in the header for reassembly at a receiving end.

As described above, in the LTE system, data processing of the RLC layer, the MAC layer, and the PHY layer may start from the time when the uplink transmission resource is received.

Figure 6:
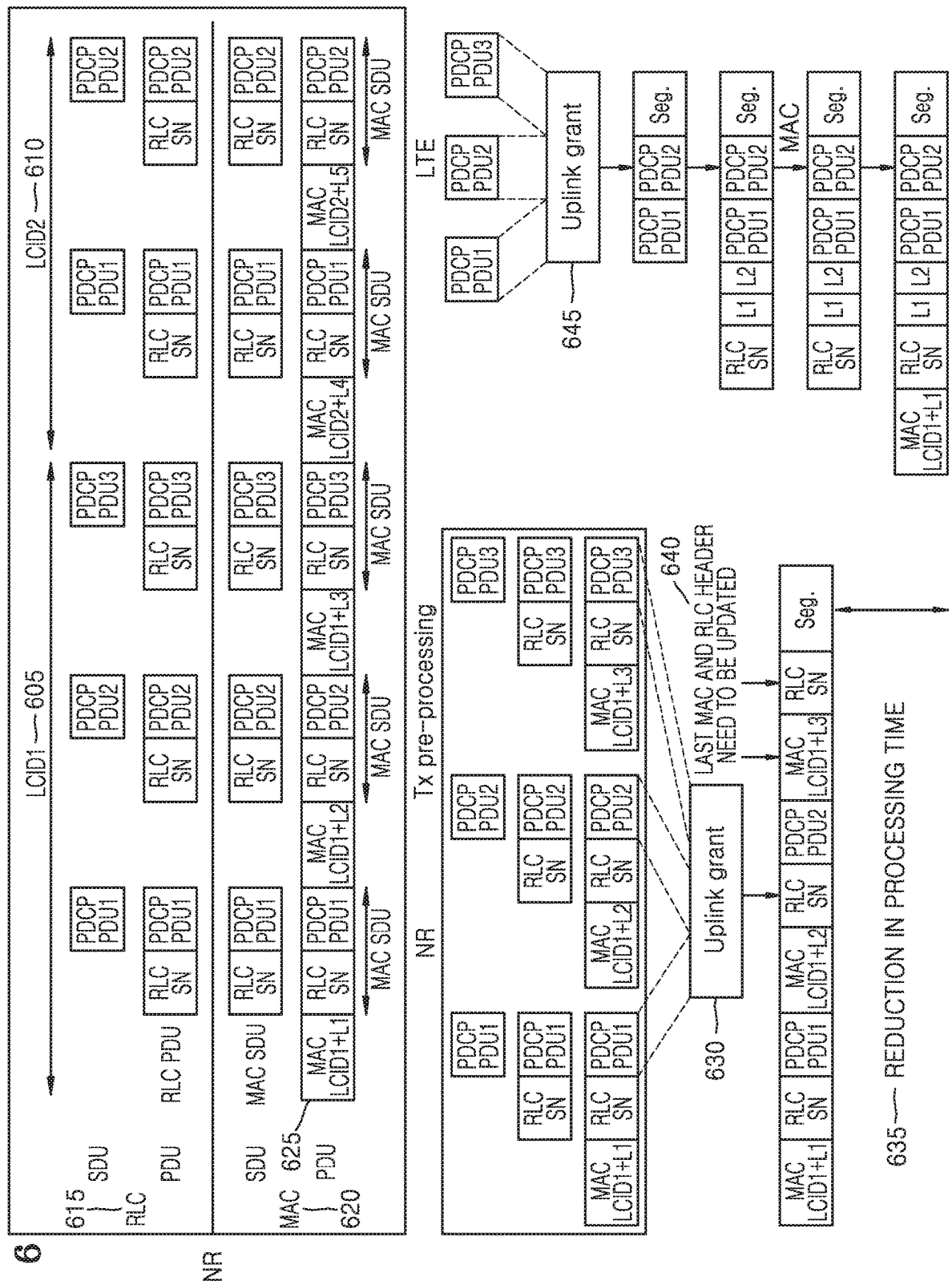
FIG. 6 is a diagram illustrating a structure for processing data in the next-generation mobile communication system, according to an embodiment.

FIG. 6 is a diagram illustrating a structure for processing data in the next-generation mobile communication system, according to an embodiment.

As illustrated in FIG. 6, the next-generation mobile communication system may perform RLC layer data processing with the PDCP layer for each logical channel. That is, a logical channel 1 605 and a logical channel 2 610 may have different PDCP layers and RLC layers and may perform independent data processing. Also, an RLC PDU generated from the RLC layer 615 of each logical channel may be delivered to a MAC layer 620, configured as one MAC PDU, and then transmitted to a receiving end. In the LTE system, the PDCP layer, the RLC layer 615, and the MAC layer 620 may include the functions described with reference to FIG. 4 and may perform the corresponding operations.

In the next-generation mobile communication system, PDCP PDUs may not be concatenated in the RLC layer 615. As illustrated in FIG. 6, the next-generation mobile communication system may have a structure that has a MAC sub-header for each MAC SDU in a MAC PDU structure 625, that is, a structure in which MAC sub-headers are repeated in units of MAC SDUs.

Therefore, in the next-generation mobile communication system may perform pre-processing on data in advance even before the reception 630 of the uplink transmission resource. That is, before receiving the uplink transmission resource, the UE may perform PDCP processing (deciphering, integrity protection, etc.) on an IP packet when a PDCP layer receives an IP packet, and generates a PDCP header to generate a PDCP PDU. Also, the UE may deliver the generated PDCP PDU to the RLC layer 615 to configure the RLC header and the RLC PDU and deliver the RLC PDU to the MAC layer 620 to configure the MAC sub-header and the MAC SDU in advance.

However, this is only an example. According to another embodiment, the UE may perform data pre-processing only up to the RLC layer 615 and may perform data processing in the MAC layer 620 when the uplink transmission resource is received. Also, according to another example, the UE may generate and process headers separately by performing data pre-processing on only one of the PDCP header, the RLC header, and the MAC header. That is, the UE may generate headers by separately performing data pre-processing on headers before the uplink transmission resource is received. When the transmission resource is received, the UE may concatenate the headers to data to configure the PDCP PDU, the RLC PDU, or the MAC PDU.

When data pre-processing is not implemented in the UE, data processing may be performed after receiving the uplink transmission resource (UL grant) as in the LTE system. That is, when the transmission resource is allocated for each logical channel after an LCP procedure, the UE may configure the PDCP header considering the size of the allocated transmission resource, generate the PDCP PDU, configure the RLC header to generate the RLC PDU, and configure the MAC sub-header and the MAC SDU. When data pre-processing is not implemented in the next-generation mobile communication system, a difference from the LTE system is that data is not concatenated in the RLC layer.

In the next-generation mobile communication system, upon reception 630 of the uplink transmission resource, the UE may configure the MAC PDU by bringing the MAC sub-header and the MAC SDUs as many as the size of the uplink transmission resource. According to another embodiment, when the UE performs data pre-processing up to the RLC layer, the MAC layer may receive the RLC PDU from each RLC layer and may configure the MAC PDU by configuring and multiplexing the MAC sub-header and the MAC SDUs according to uplink transmission resource. In this case, the MAC sub-header may also be pre-processed according to the implementation.

When the uplink transmission resource is not sufficient, the UE may perform segmentation so as to fully fill and efficiently use the transmission resource. Also, when the split operation is performed, the RLC header and the MAC header corresponding to the segmentation may be updated (640). For example, segmentation information or length information may be included in the RLC header, and an L field corresponding to the length information about the MAC header may be updated.

Therefore, when the reception 630 of the uplink transmission resource in the next-generation mobile communication system and the reception 645 of the uplink transmission resource in the LTE system are performed at the same time, the next-generation mobile communication system may obtain a gain 635 of the processing time.

The RLC layer and the PDCP layer may use one common serial number when necessary or when set in the network.

Also, the pre-processing may be performed for each logical channel. RLC PDUs pre-processed for each logical channel may be additionally pre-processed into MAC SDUs and MAC sub-headers again in the MAC layer according to the implementation. According to another embodiment, the MAC layer may be implemented to perform data processing only when the uplink transmission resource is allocated. According to another embodiment, the MAC sub-header may be implemented to be generated in advance.

Also, when the MAC layer receives the uplink transmission resource (630), the UE may allocate the uplink transmission resource for each logical channel to multiplex the previously generated MAC SDUs and MAC sub-headers.

When the MAC layer receives the uplink transmission resource from the base station, an LCP procedure may be performed and the uplink transmission resource may be allocated for each logical channel. Also, the MAC layer may configure MAC SDUs and MAC sub-headers, generated by data pre-processing for each logical channel, according to the uplink transmission resource for each logical channel, multiplex data for each logical channel to configure one MAC PDU, and deliver the MAC PDU to the PHY layer.

When the uplink transmission resource allocated to each logical channel is not sufficient, the MAC layer may request the RLC layer to segment the data. When the RLC layer performs the segmentation, information about the segmentation may be included in the header. Therefore, the header may be updated, and the updated header may be delivered to the MAC layer. The MAC layer may update the corresponding MAC header based on the delivered header.

As mentioned above, the next-generation mobile communication system may perform data processing of the PDCP layer, the RLC layer, or the MAC layer before the reception 630 of the uplink transmission resource. When data pre-processing is not implemented, the next-generation mobile communication system may perform data processing after the reception of the uplink transmission resource (UL grant) as in the LTE system. That is, when the transmission resource is allocated for each logical channel after an LCP procedure, the next-generation mobile communication system may configure the PDCP header considering the size of the allocated transmission resource, generate the PDCP PDU, configure the RLC header to generate the RLC PDU, and configure the MAC sub-header and the MAC SDU. When data pre-processing is not implemented in the next-generation mobile communication system, a difference from the LTE system is that data is not concatenated in the RLC layer.

In the embodiment described herein, the LCP procedure may indicate a procedure in which the UE distributes the uplink transmission resource (uplink grant) received from the base station to each logical channel of the UE. For example, when the UE receives the uplink transmission resource of 500 kilobytes, the UE may perform the LCP procedure to allocate 100 kilobytes of the transmission resource to logical channel 1, 200 kilobytes of the transmission resource to logical channel 2, and 200 kilobytes of the transmission resource to logical channel 3.

When there are 9 bytes to be transmitted through the MAC CE, the UE may perform the LCP procedure with respect to (500 kilobytes-9 bytes), excluding 9 bytes. When the UE allocates the transmission resource, the UE may consider the size of the MAC sub-header, the RLC header, or the PDCP header or the size of the MAC control element (CE). That is, the UE has to configure the MAC PDU according to the size of the transmission resource, and the MAC PDU may include the MAC sub-header, the RLC header, the PDCP header, and the MAC CE. Because the MAC CE has the highest priority, upon receiving the uplink transmission resource, the UE may perform the LCP procedure on the uplink transmission resource remaining after excluding the size of the MAC CE to be transmitted. That is, the UE may secure resources to be transmitted in advance so as to surely transmit the MAC CE.

The UE may allocate the uplink transmission resource to each logical channel by performing the LCP procedure on the uplink transmission resource remaining after excluding the size of the MAC sub-headers according to the implementation.

Figure 7:
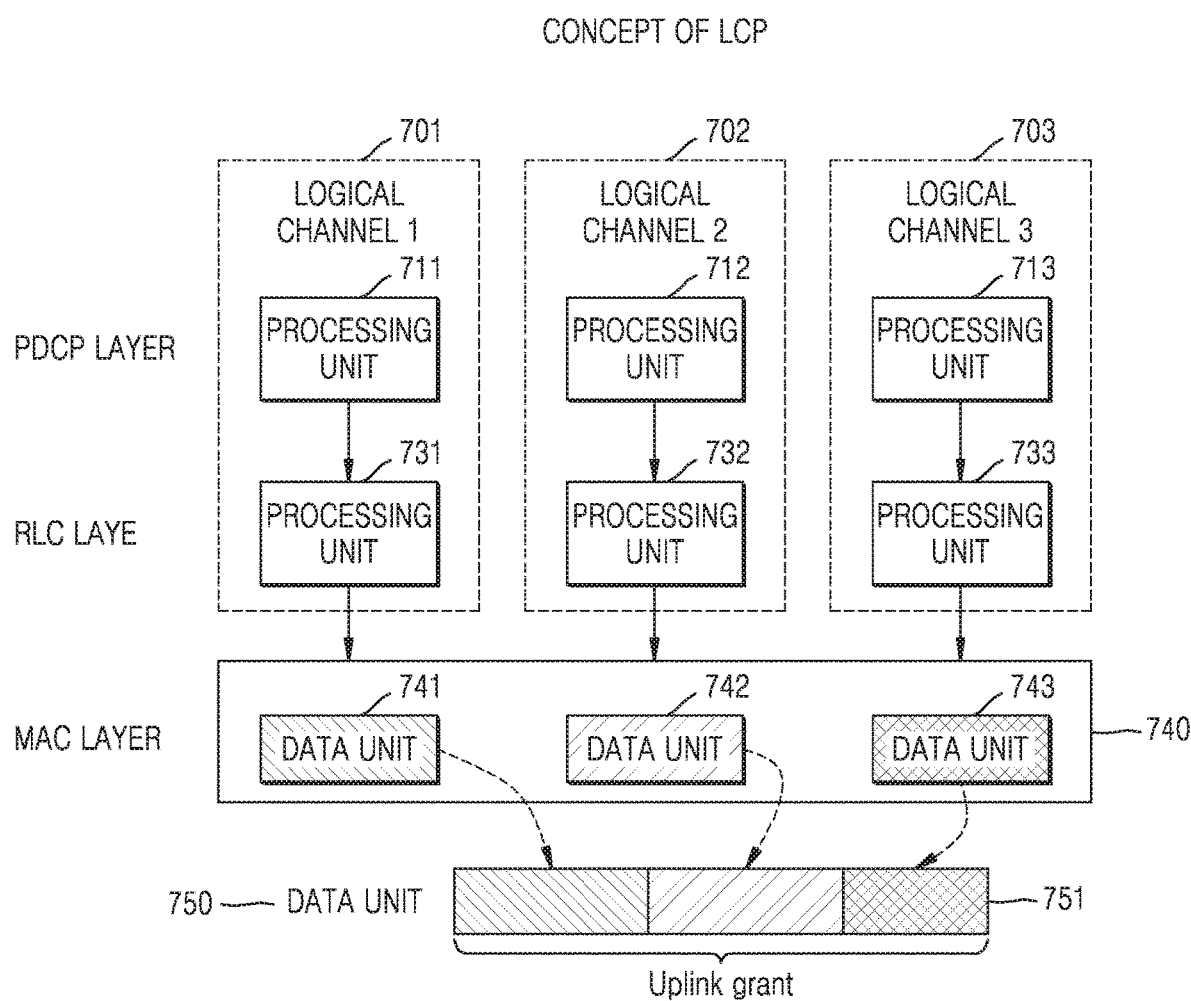
FIG. 7 is a diagram for describing a concept of a transmission resource allocation (logical channel prioritization (LCP)) procedure applicable to the present disclosure.

FIG. 7 is a diagram for describing a concept of an LCP procedure applicable to the present disclosure.

In FIG. 7, logical channels for data of four different services of the UE may be configured as logical channel 1 701, logical channel 2 702, and logical channel 3 703, respectively. A PDCP layer and an RLC layer for processing data for each logical channel may be provided. That is, there may be processing units 711, 712, 713, 731, 732, and 733 that generate data units 741, 742, and 743 by segmenting and multiplexing data according to the size of the transmission resource determined according to the LCP procedure.

The UE may receive configuration information about at least one of priority of each logical channel, a prioritized bit rate (PBR), a bucket size duration (BSD), numerology, and a transmission time interval (TTI) through an RRC message (e.g., an RRCConnectionReconfiguration message). For example, the PBR and the BSD may be designated as the prioritisedBitRate and bucketSizeDuration variables of the RRC message, and the numerology and the TTI may be configured through at least one of new variables, mapping information with the logical channel, logical channel configuration information (logicalchannelconfig), and bearer configuration information (drb-config).

Also, as the priority value of the above-described logical channel is smaller, the priority may be higher. However, this is only an example. According to another embodiment, a higher priority value of the logical channel may be configured to have a higher priority.

The UE may perform the LCP procedure by using the above-described information. The LCP procedure can logically include a token bucket model. Each logical channel has a token called Bj and a bucket that contains the token. j is an index representing each logical channel. Logical channel 1, logical channel 2, and logical channel 3 may have tokens B1, B2, and B3, respectively, and the tokens B1, B2, and B3 may be contained in bucket 1, bucket 2, and bucket 3, respectively. The token indicates the size of a resource that each logical channel is able to occupy when the uplink transmission resource is allocated to the UE, and PBR×TTI may be added for each TTI. However, even when the token value increases by PBR×TTI for each TTI, the token value does not exceed the BSD, which is the maximum size of each bucket. Therefore, when the token value of the bucket reaches or exceeds the BSD value, the PBR×TTI value may not be added for each TTI and the BSD value may be maintained.

Based on the above-described configuration information and rule, the LCP procedure may be performed in two steps. First, the UE may select logical channels having a token value greater than 0 and perform the LCP procedure on the logical channels. In the first step, the UE may allocate the uplink transmission resource to each logical channel considering the priority and the token value of each logical channel. That is, in the first step, each logical channel may occupy the uplink transmission resource only as much as the token value possessed according to the priority. The logical channels may subtract their current token values by the resource size occupied by the uplink transmission resource.

In the first step, when there are resources remaining after all logical channels occupy the uplink transmission resource as much as the token value, the second step may be performed. In the second step, the logical channels may occupy the remaining uplink transmission resource according to the priority. In the second step, the LCP procedure may be performed according to the priority until all logical channel buffers are emptied or all remaining uplink transmission resource is used. In the second step, the tokens may not be subtracted from the resource occupied by each logical channel.

In order to represent the LCP procedure with more specific pseudo codes, variables are defined as follows. The following pseudo codes may be an example of the LCP procedure, and various modifications with the same meaning are possible.

1. It is assumed that the total number of logical channels of the UE is K.

2. The UE receiving the uplink transmission resource calculates the uplink transmission resource and indicates its size as a variable "UplinkGrant."

3. The logical channels are sorted in the order of priority and mapped to an LC_j variable (it is assumed that j=1, 2, . . . , j has a natural value, and the priority is higher as the value is smaller. For example, the priority is LC_1>LC_2>LC_3>LC_4).

4. Each token value of the logical channels mapped to each LC_j is represented by Bj, the data size remaining in each buffer is represented by Buffer j, and the maximum size of each buffer is represented by BSDj. Also, the resource allocated to each logical channel is indicated by LC_grant_j.

Similar codes for the LCP procedure using the above-described variables are as follows.

TABLE 1

Token update procedure

% The following token update procedure is performed for each TTI.
% Initially, Bj = 0 and j = 1, 2, ..., K are set, and PBR and BSD are set by RRC message.
01  For j=1 to K
02    If Bj < BSDj,
03      Bj = Bj + PBRxTTI
04    else
05      Bj = BSDj
06    end
07  end

TABLE 2

Two-step LCP procedure of LTE system

% When uplink grant (UplinkGrant) is allocated, the UE performs the first step of the LCP procedure as follows.
% Initially, the resource allocated to each logical channel is set as LC_grant_j = 0, j = 1, 2, ..., K.
01  For j = 1 to K
02    If UplinkGrant >= Bj
03      UplinkGrant = UplinkGrant − Bj;
04      LC_grant_j = LC_grant_j + Bj;
05      Bj = 0;
06    else
07      LC_grant_j = LC_grant_j + UplinkGrant;
08      Bj = Bj − UplinkGrant;
09      UplinkGrant = 0;
10      break;
11    end
12  end TABLE 2-continued Two-step LCP procedure of LTE system % When the uplink grant remains after the first step is performed, the following second step is performed.
```
12   If UplinkGrant > 0
13     For j = 1 to K
14       If UplinkGrant >= Buffer_j
15         UplinkGrant = UplinkGrant - Buffer_j;
16         LC_grant_j = LC_grant_j + Buffer_j;
17         Buffer_j = 0;
18       else
19         LC_grant_j = LC_grant_j + UplinkGrant;
20         Buffer_j = Buffer_j - UplinkGrant;
21         UplinkGrant = 0;
22         break;
23       end
24     end
25   end
```

When the uplink transmission resource is allocated to each logical channel through the above-described LCP procedure, each logical channel may generate data based on the allocated transmission resource and deliver the data to the MAC layer. The MAC layer may generate a MAC PDU (750 in FIG. 7) based on the delivered data units 741, 742, and 743. Also, the MAC layer may transmit the MAC PDU 750 through the uplink.

In the next-generation mobile communication system, a procedure considering the numerology or the TTI may be added to the above-described LCP procedure. For example, the LCP procedure may be performed only on the logical channels selected by the numerology or the TTI. That is, transmission resources may be allocated only to the selected logical channels. Also, the next-generation mobile communication system is based on the above-described LCP procedure, but another procedure may be added or the LCP procedure may be modified and applied.

Figure 8:
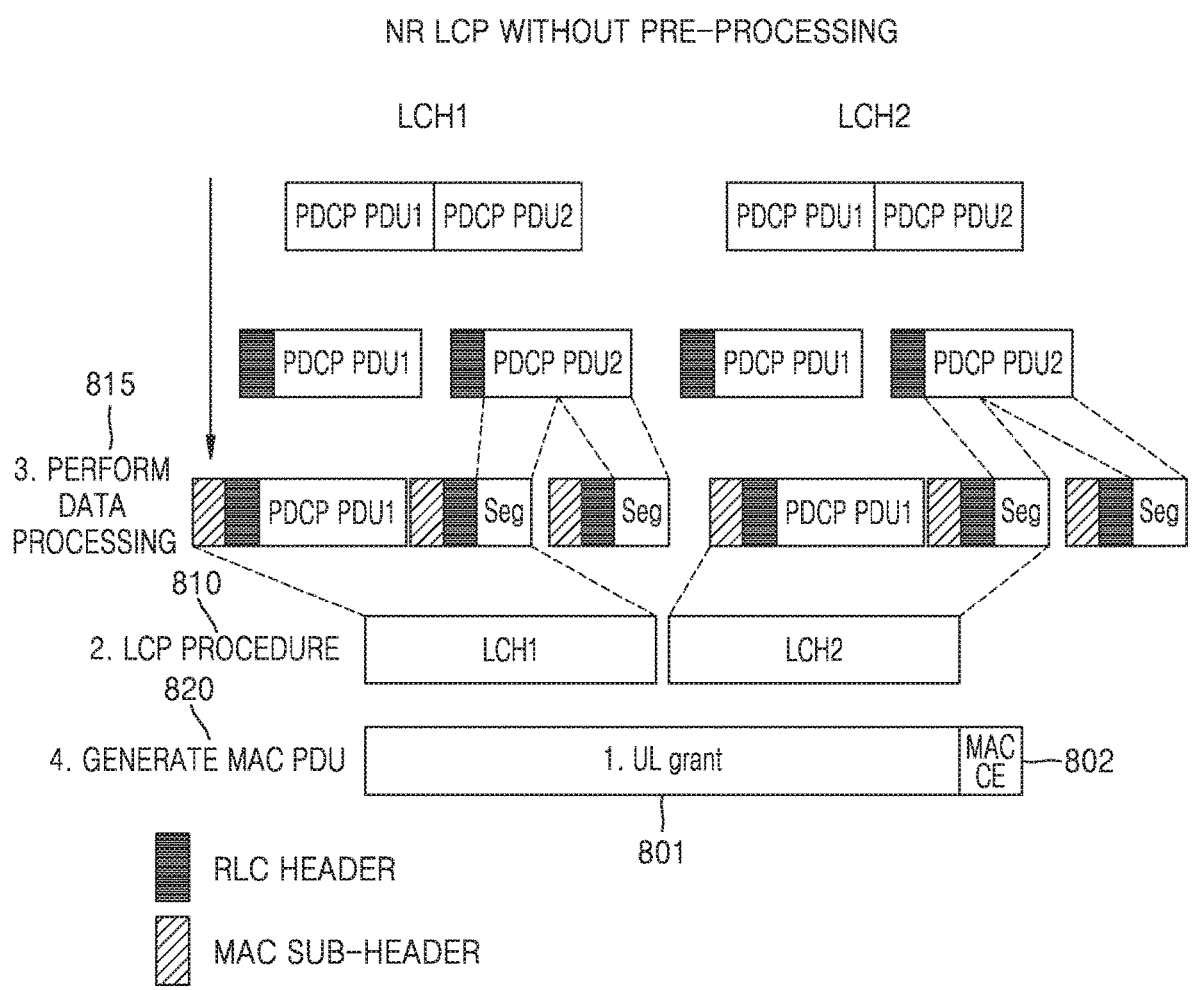
FIG. 8 is a diagram illustrating a procedure in which a UE performs an LCP procedure and configures a medium access control (MAC) packet data unit (PDU) corresponding to an uplink transmission resource in a next-generation mobile communication system that does not implement data pre-processing, according to an embodiment.

FIG. 8 is a diagram illustrating a procedure in which a UE performs an LCP procedure and configures a MAC PDU corresponding to an uplink transmission resource in a next-generation mobile communication system that does not implement data pre-processing, according to an embodiment.

In FIG. 8, when the transmission of the MAC CE is required after the uplink transmission resource (UL grant, uplink grant) 801 is received, the UE may perform an LCP procedure on the size of the remaining transmission resources after excluding the transmission resources corresponding to the size 802 of the MAC CE from the entire transmission resources. Only when the transmission resources corresponding to the size 802 of the MAC CE are secured in advance, the MAC CE having a high priority may always be transmitted.

The LCP procedure in FIG. 8 may follow the procedure described with reference to FIG. 7 or a modified procedure. As a result of the LCP procedure 810, transmission resources to be allocated for each logical channel may be determined. When the MAC layer delivers the size of the transmission resource for each logical channel, determined as a result of the LCP procedure 810, to the RLC layer corresponding to each logical channel, the UE may perform data processing 815. The data processing 815 may be performed for each logical channel. The PDCP layer may perform deciphering or integrity protection (when set, perform compression on the IP packet header), generate the PDCP header, configure the PDCP PDU, and deliver the PDCP PDU to the RLC layer. Also, the RLC layer may configure the RLC header for each PDCP PDU and deliver the RLC header to the MAC layer. The MAC layer may configure the MAC sub-header to generate the MAC sub-header and the MAC SDUs. The MAC layer may be configured so that the size of the generated MAC sub-header and MAC SDUs match the size of the received transmission resource. When the segmentation is required because the size of the transmission resource is not sufficient, the segmentation may be performed in the RLC layer, and the RLC header of each segmented data may be newly configured and delivered again to the MAC layer. The MAC layer may process data to match the size of the transmission resource based on the newly delivered RLC header.

For example, the RLC layer may consider the size of the transmitted resource received from the MAC layer so that some PDCP PDUs configure the RLC header according to the size, and may deliver the RLC header to the MAC layer to configure the MAC sub-header, thereby directly generating the MAC sub-header and the MAC SDU. According to another embodiment, the RLC layer may perform the segmentation on other PDCP PDUs to configure the RLC header suitable for each segmented data, and may deliver each segmented data to the MAC layer to generate the MAC sub-header and the MAC SDUs. The operation of configuring the RLC header may include, for example, updating an SI field or adding an SO field.

The MAC layer may generate the MAC PDU (820) suitable for the size of an uplink transmission resource by using the MAC sub-header and the MAC SDUs generated for each logical channel.

Figure 9:
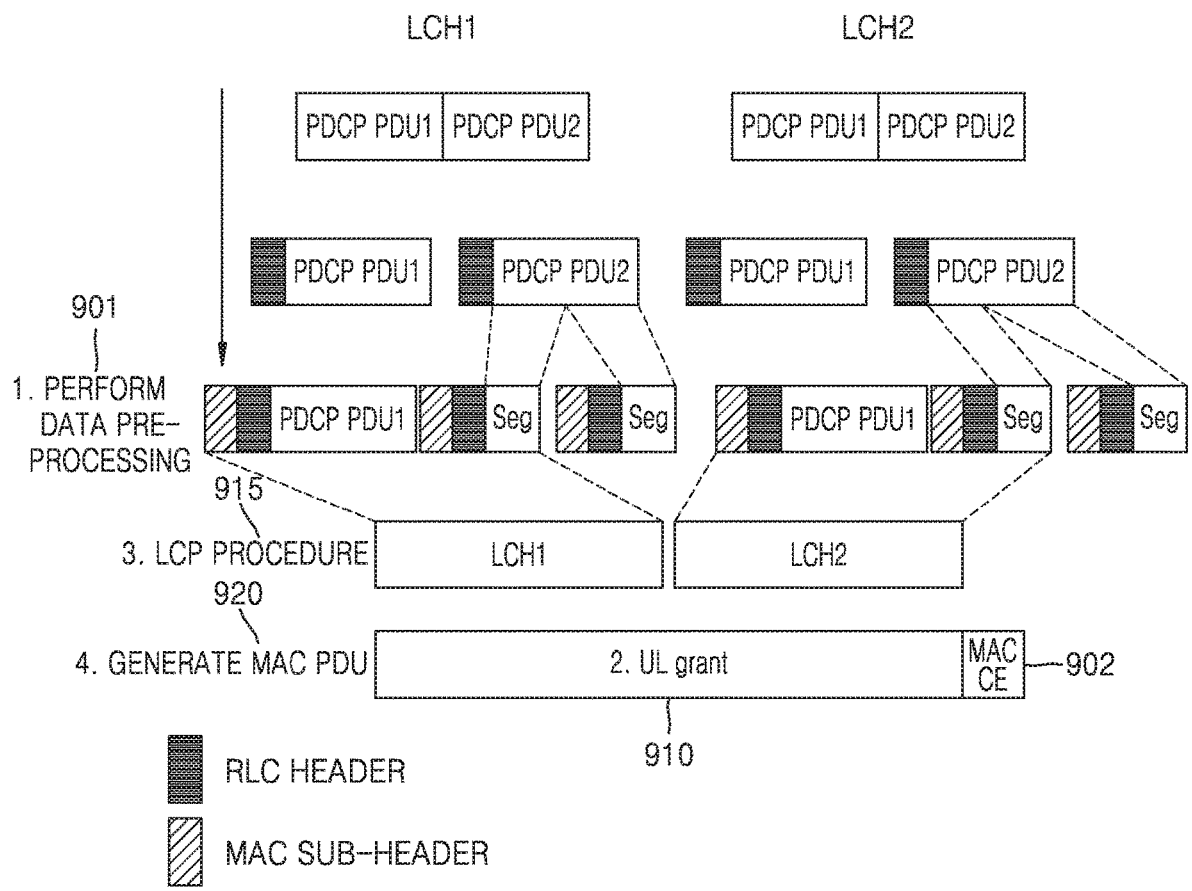
FIG. 9 is a diagram illustrating a procedure in which a UE performs an LCP procedure and configures a MAC PDU corresponding to an uplink transmission resource in a next-generation mobile communication system that implements data pre-processing, according to an embodiment.

FIG. 9 is a diagram illustrating a procedure in which a UE performs an LCP procedure and configures a MAC PDU corresponding to an uplink transmission resource in a next-generation mobile communication system that implements data pre-processing, according to an embodiment.

In FIG. 9, the UE may perform a data pre-processing procedure 901 before receiving an uplink transmission resource (UL grant, uplink grant) 910. That is, in each logical channel, the PDCP layer may perform deciphering or integrity protection (when set, perform compression on the IP packet header), generate the PDCP header, and configure the PDCP PDU. Also, the PDCP layer may deliver the PDCP PDU to the RLC layer. The RLC layer may configure the RLC header for each PDCP PDU and deliver the RLC header to the MAC layer. The MAC layer may configure the MAC sub-header, generate the MAC sub-header and the MAC SDU, and perform data pre-processing.

This is only an example. According to another embodiment, data pre-processing may be performed only up to the RLC layer, and data processing may be performed in the MAC layer when the uplink transmission resource is received. According to another embodiment, data pre-processing may be performed only on the PDCP header, the RLC header, or the MAC header. That is, the UE may generate headers by separately performing data pre-processing on the headers before the uplink transmission resource is received. When the transmission resource is received, the UE may concatenate the headers to data to configure the PDCP PDU, the RLC PDU, or the MAC PDU (901).

When the UE receives the uplink transmission resource (UL grant, uplink grant) 910 after the data pre-processing and then the transmission of the MAC CE is required, the UE may perform an LCP procedure 915 on the size of the remaining transmission resources after excluding the transmission resources corresponding to the size 902 of the MAC CE from the entire transmission resources. Only when the transmission resources corresponding to the size 902 of the MAC CE are secured in advance, the MAC CE having a high priority may always be transmitted. As a result of the LCP procedure 915, transmission resources to be allocated for each logical channel may be determined. When the size of the transmission resource for each logical channel is determined as a result of the LCP procedure 915, the MAC layer may check the size of the MAC sub-header and MAC SDUs pre-processed for each logical channel and configure MAC PDUs to match the size of the transmission resources. In this case, when the size of the transmission resources is not sufficient, the segmentation may be performed on the pre-processed MAC sub-header and MAC SDUs. The segmentation is performed in the RLC layer, and the RLC header may be newly configured for the segmented data. For example, the SI field may be updated, or the SO field may be added.

Also, the MAC sub-header may be newly configured for the segmented data. For example, as the size of the RLC PDU changes, the L field value of the MAC sub-header may be updated.

The MAC layer may configure the size of the MAC sub-header and the MAC SDUs determined from each logical channel so as to match the size of the transmission resource determined from the LCP procedure 915 and generate the MAC PDU based on this (920).

According to the embodiment described herein, a method, performed by the UE, of configuring efficient transmission data (MAC PDU) in the next-generation mobile communication system based on the above-described LCP and data pre-processing is proposed. The MAC PDU may include IP packet data (or data) of each logical channel, a PDCP header, an RLC header, a MAC sub-header, MAC control information (MAC CE), and padding.

The present disclosure provides an example of efficiently configuring a buffer status report (BSR) among pieces of MAC control information (MAC CE) as a method of configuring efficient transmission data (MAC PDU). This will be described below in more detail with reference to FIG. 11.

The MAC sub-header may include an F field, an LCID field, and an L field. The LCID field is a logical channel identifier and is a field that serves to indicate each logical channel (RLC layer) or MAC control information (MAC CE). The L field may have a size of 1 byte or 2 bytes. Also, the F field having a size of 1 bit is a field indicating whether the length of the L field is 1 byte or 2 bytes. The LCID field is 6 bits and may indicate 256 different logical channels and MAC CEs.

A plurality of logical channels may be configured to support various services. The UE may configure the BSR with the MAC control information (MAC CE) so as to deliver the BSR for logical channels to the base station, and may transmit the MAC PDU including the BSR. In this case, the BSR is not performed for each logical channel and may be performed for each logical channel group. That is, a plurality of logical channels may be grouped into one group.

Which logical channels belong to the group and to which group the logical channel belong may be configured by the base station. Up to eight logical channel groups may be configured, and each group may be identified through a logical channel group identifier (LCG ID). Buffer status reporting for each logical channel group may be performed through the logical channel group identifier.

Figure 10:
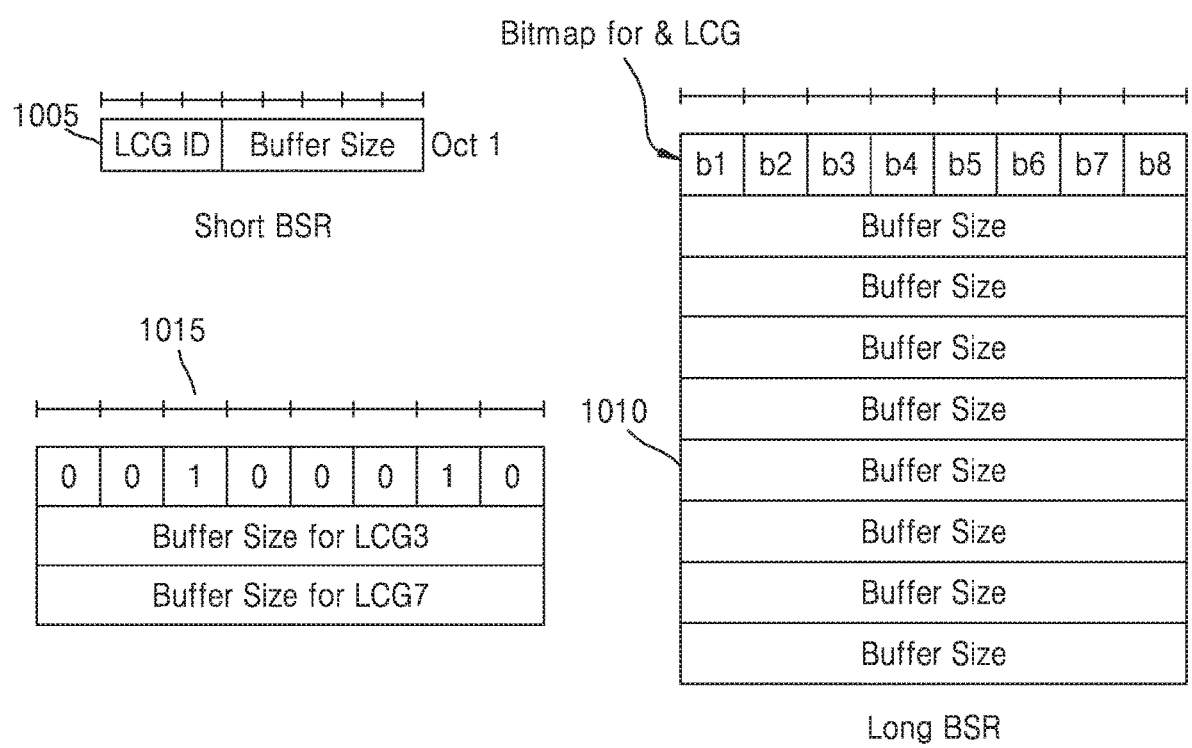
FIG. 10 is a diagram for describing two formats that are applicable when buffer status reporting is performed in a next-generation mobile communication system.

FIG. 10 is a diagram for describing two formats that are applicable when buffer status reporting is performed in a next-generation mobile communication system.

As illustrated in FIG. 10, in the next-generation mobile communication system, two formats may be used to perform buffer status reporting. The first format is a short BSR format having a fixed size of 1 byte (1005). The short BSR format may include a logical channel group identifier (LCG ID) indicating one of the eight logical channel groups, and a 5-bit buffer size field indicating the buffer status for the logical channel group indicated by the logical channel group identifier.

The second format is a long BSR format having a variable size (1010). The long BSR format 1010 has a 1-byte bitmap as represented by reference numeral 1010 of FIG. 10 and has buffer size fields corresponding thereto. The long BSR format has a variable size. That is, each bit of the 1-byte bitmap may indicate logical channel groups 0 to 7, which are sequentially identified by the logical channel group identifiers. That each bit of the bitmap is set to 1 means that data to be transmitted is present in the corresponding logical channel group and the buffer status is reported and means that the buffer size field corresponding thereto is present. In contrast, that each bit of the bitmap is set to 0 means that no data to be transmitted is present and no buffer size field is present.

For example, when only the third and seventh bits are set to 1 in the 1-byte bitmap (1015), it means that only logical channel group 3 and logical channel group 7 have data to be transmitted, and the sizes of the buffer size field corresponding thereto are present in sequence.

Figure 11:
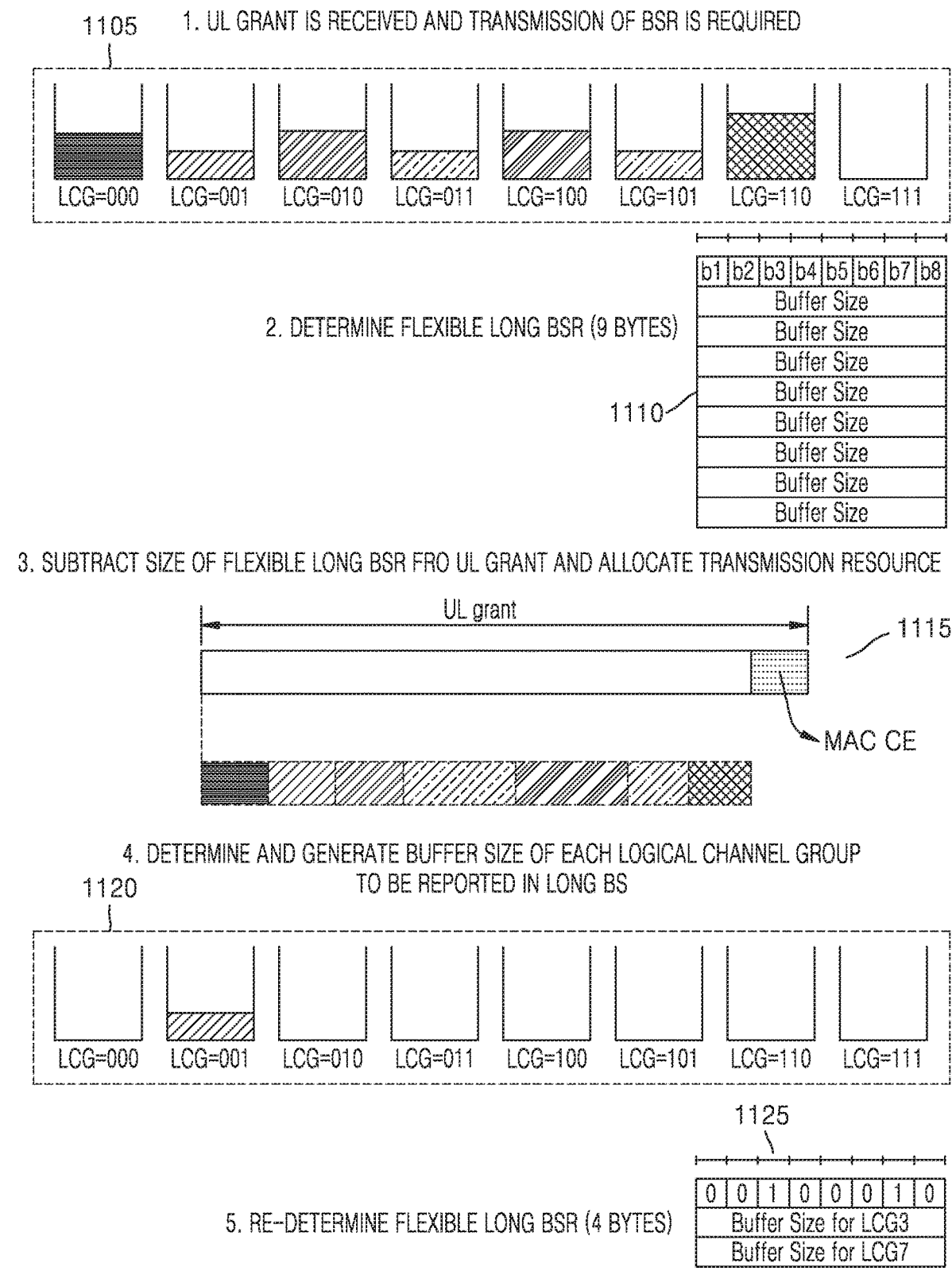
FIG. 11 is a diagram for describing a method of efficiently configuring a buffer status report (BSR) among pieces of MAC control information (MAC CE), according to an embodiment.

FIG. 11 is a diagram for describing a method of efficiently configuring a BSR among pieces of MAC control information (MAC CE), according to an embodiment.

Upon receiving the uplink transmission resource, the UE may determine whether to transmit the BSR as the MAC CE. When the UE determines to transmit the BSR as the MAC CE, the MAC CE has to be transmitted by using the uplink transmission resource because the MAC CE has a higher priority than logical channels.

In order to transmit the BSR, the UE may check the buffer status of the current logical channel groups. As a result of the checking, when there is data to be transmitted for seven logical channel groups, that is, logical channel groups 0 to 6, among the eight logical channel groups (1105), the UE may determine the BSR format as the long BSR 1110. As the buffer status reporting has to be performed for the seven logical channel groups, transmission resources for the 1-byte bitmap, the seven 1-byte buffer size fields, and the 1-byte MAC sub-header may be required. That is, a transmission resource of at least 9 bytes may be required.

Therefore, in order to ensure transmission of the MAC CE having a high priority, the UE may perform the LCP procedure on the transmission resource remaining after excluding the transmission resource for the MAC CE (1115). In this case, when there are a plurality of MAC CEs to be transmitted, including a power headroom report (PHR), the UE may perform the LCP procedure on the uplink transmission resources remaining after subtracting the size of the transmission resource capable of transmitting the MAC CEs.

After completing the LCP procedure, the UE may allocate the transmission resources to each logical channel. Also, the MAC layer of the UE may configure data corresponding to each transmission resource and multiplex the data according to the size of the uplink transmission resource to configure the MAC PDU. As described above, after configuring data from each logical channel and loading the data on the transmission resource, the buffer status 1120 may be changed as illustrated in FIG. 11.

The UE may use a long BSR format having a size of 9 bytes determined in the above-described procedure. That is, the bitmap may be configured to 1111 1110 and the buffer size field may be configured to 0 for logical channel groups 0, 2, 3, 4, and 6. For logical channel group 1 and logical channel group 5, the buffer size field may be configured for the remaining buffer size. The buffer size field may be determined through a table capable of indicating the buffer size for 2^8 sections. The buffer size section of the table may be indicated by 8 bits.

The UE according to the embodiment may determine the long BSR format again based on the current remaining buffer status, rather than using the 9-byte long BSR format previously determined as described above. That is, when only logical channel group 1 and logical channel group 5 have data to be transmitted according to the buffer status 1120 after loading the data on the transmission resource, the UE may reselect the long BSR 1125 of 4 bytes having a 1-byte bitmap, two buffer size fields with a size of 1 byte, and a 1-byte MAC sub-header size. That is, the UE according to the embodiment may perform buffer status reporting more efficiently by performing buffer status reporting only on logical channel groups having data to be transmitted.

The buffer status reporting method according to the embodiment may prevent a procedure for configuring a long BSR format having an unnecessarily large size. In the case of the above-described example, as five bytes are saved from 9 bytes to 4 bytes, the UE may save the uplink transmission resource. Also, the saved uplink transmission resource may be used to prevent unnecessary segmentation or transmit data in other embodiments to be described below. Therefore, the transmission resource efficiency may be increased.

The buffer status reporting method according to the above-described embodiment may be described as a series of operations as follows.

1. Receiving uplink transmission resource and determining whether to transmit BSR as MAC CE 2. When transmission of BSR is determined, checking buffer status of current logical channel groups and determining size of BSR 3. When transmission of BSR is determined, performing LCP procedure on transmission resource remaining after subtracting the determined size of BSR from uplink transmission resource 4. Processing data according to transmission resource allocated to each logical channel 5. After processing and allocating data of each logical channel to transmission resource, checking buffer status of each current logical channel group again and re-determining BSR 6. Configuring each field according to determined short BSR format or long BSR and including BSR as MAC CE at the end of MAC PDU A procedure for selecting a short BSR format and a long BSR format may be determined according to one of the methods proposed below. Also, the buffer status table indicated by the 5-bit BS field of the short BSR format and the buffer status table indicated by the 8-bit BS field of the long BSR format may share the same table and may use different tables.

First selection method: The short BSR format may be used when data to be transmitted is present only in one logical channel group among logical channel groups and the buffer status reporting has to be performed. Also, the long BSR format may be used when data to be transmitted is present in two or more logical channel groups and the buffer status reporting has to be performed. When padding occurs and there is only 1 byte of the transmission resource to which padding is to be added, the padding BSR may be transmitted by using the short BSR. Also, when a plurality of logical channel groups have data to be transmitted, the UE may perform buffer status reporting for the logical channel group to which the logical channel having the highest priority belongs or the logical channel group having the highest priority.

Second selection method: When data to be transmitted is present only in one logical channel group among the logical channel groups and buffer status reporting has to be performed, the long BSR format is used when the size of the data to be transmitted in one logical channel group is larger than a certain threshold value, and the short BSR format may be used when the size of the data to be transmitted is smaller than the certain threshold value. The certain threshold value may be set according to the implementation of the UE, and the base station may set the value with the RRC message. The certain threshold value may be set considering the buffer status table of the short BSR, the maximum indicationable buffer size of the table, and the unit of the 5-bit buffer size field.

The reason for setting the threshold value is that, when considering the range of the buffer sizes capable of being indicated by the 5-bit buffer size field and the range of the buffer sizes capable of being indicated by the 8-bit buffer size field, the 8-bit buffer size field contains more accurate information, and therefore, reporting is performed through the long BSR format by using the 8-bit buffer size field for the buffer size of a certain size or more. A gap between the size of the data to be actually transmitted and the size at which the base station receives the buffer status report is maximally reduced. Therefore, the base station may more accurately perform LCP through scheduling.

Also, the long BSR format may be used when data to be transmitted is present in two or more logical channel groups and the buffer status reporting has to be performed. When padding occurs and there is only 1 byte of the transmission resource to which padding is to be added, the padding BSR may be transmitted through the short BSR. Also, when a plurality of logical channel groups have data to be transmitted, the UE may perform buffer status reporting for the logical channel group to which the logical channel having the highest priority belongs or the logical channel group having the highest priority.

Figure 12:
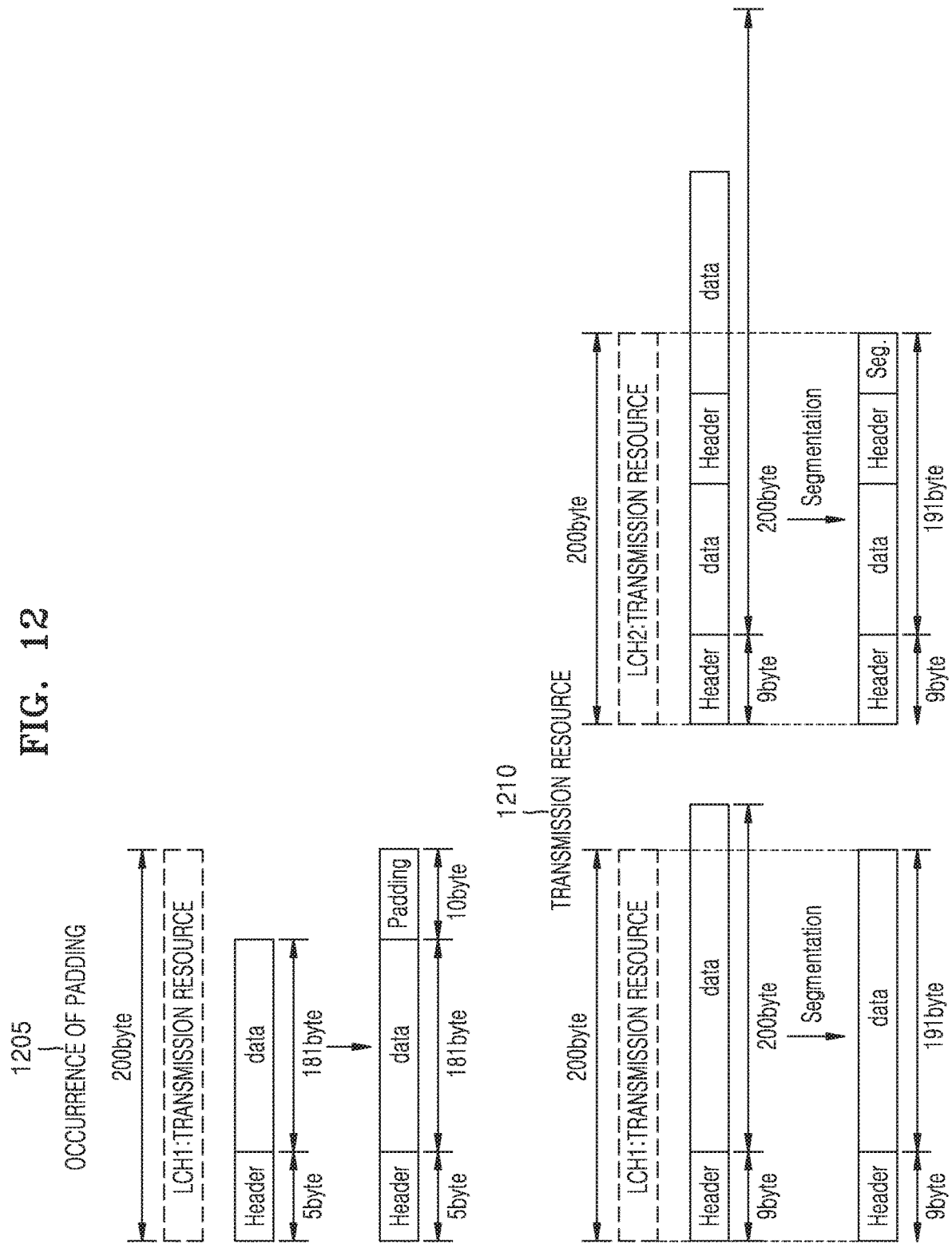
FIG. 12 is a diagram for describing padding and segmentation.

In the embodiment described herein, the method of determining and resizing the flexible long BSR may be applied to a regular BSR or a periodic BSR. In the case of padding BSR or truncated BSR, as proposed, instead of performing the LCP procedure by subtracting the size of the MAC control information (BSR) from the uplink transmission resource in advance, the UE may perform the LCP procedure on the uplink transmission resource, configure padding BSR or truncated BSR in the remaining transmission resource when there is a transmission resource remaining after filling all the data of each logical channel (when there is a resource to which padding is added), and add the padding BSR or truncated BSR at the end of the MAC PDU. FIG. 12 is a diagram for describing padding and segmentation.

The reason why the padding or segmentation is required is that a difference occurs between the size of the data to be actually transmitted by the UE and the size of the transmission resource allocated by the base station as the uplink transmission resource (uplink grant). When the UE reports the buffer status, the section of the buffer size is indicated in the buffer size table with 8 bits, instead of indicating the exact buffer size. Therefore, a difference may occur between the size of data and the size of the allocated transmission resource.

As illustrated in FIG. 12, the padding 1205 may occur when the size of the uplink transmission resource that the base station allocates to the UE is greater than the size of the data to be transmitted by the UE. Also, the segmentation 1210 may occur when the size of the uplink transmission resource that the base station allocates to the UE is less than the size of the data to be transmitted by the UE. That is, the padding may be added when the size of the uplink transmission resource that the base station allocates to the UE is greater than the size of the data to be transmitted by the UE, and the segmentation may be performed when the size of the uplink transmission resource that the base station allocates to the UE is less than the size of the data to be transmitted by the UE.

Performing the padding may mean filling the padding header or the padding header and the padding bits in the space remaining after filling the data when configuring the MAC PDU. Also, according to another embodiment, performing the padding may mean that the corresponding logical channel is emptied without being filled with data as much as the size of the transmission resource for padding. The emptied remaining transmission resource may be used in other logical channels.

Figure 13:
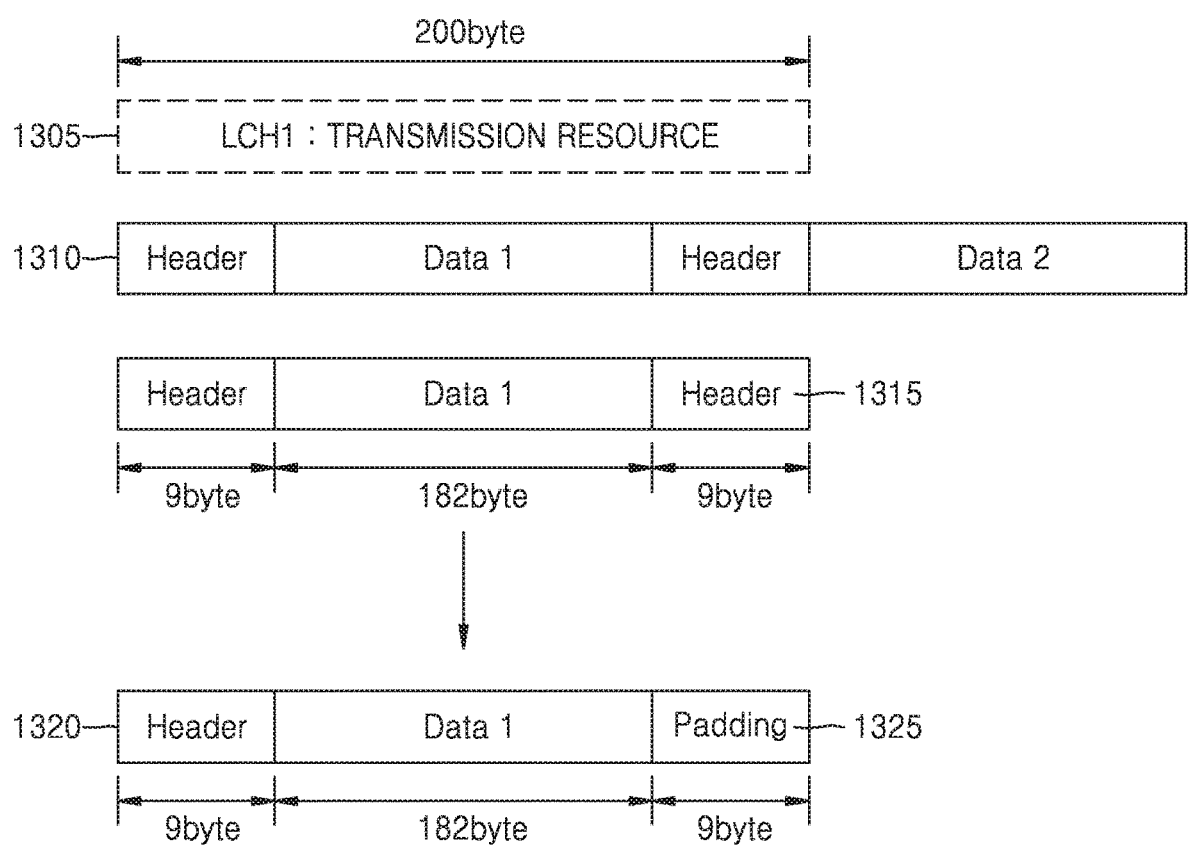
FIG. 13 is a diagram for describing a method of determining whether a UE performs padding and segmentation, according to an embodiment.

FIG. 13 is a diagram for describing a method of determining whether a UE performs padding and segmentation, according to an embodiment.

As illustrated in FIG. 13, after the LCP procedure, the uplink transmission resource may be allocated for each logical channel (1305), and the RLC layer or the MAC layer may configure data according to the allocated transmission resource. Also, when data pre-processing is performed, the PDCP layer may complete data processing (ciphering and integrity protection processing) and may generate the PDCP header and the RLC header in advance or generate even the MAC header. When data pre-processing is not performed, the PDCP header, the RLC header, or the MAC header may be dynamically generated, and the UE may perform comparison with the transmission resource and fill the data. The header of the data configuration 1310 illustrated in FIG. 13 shows the above-described headers as one. When the data is filled in the received transmission resource 1305, in a case in which the space remaining after data of the logical channel and the corresponding header are configured is as much as the size of the header as in the data configuration 1310 illustrated in FIG. 13, the configuration 1315 of filling only the header in the remaining space may be inefficient. This is because when only the header is filled in the remaining space, data is not transmitted and only the header is transmitted.

Also, even when the size of the remaining transmission resource is greater than the size of the header, a situation in which the transmission resource is not used efficiently may occur. For example, when the size of the header is 9 bytes and the size of the remaining transmission resource is 12 bytes, the data capable of being transmitted together with the 9-byte header is only 3 bytes, which is bad in the use efficiency of the transmission resources.

Therefore, after performing the LCP procedure by setting certain x bytes to each logical channel, when the UE according to the embodiment has to perform segmentation because the transmission resource is insufficient while data is filled in the transmission resource allocated to each logical channel without segmenting data of each logical channel, the UE may compare the size of the remaining transmission resource with the certain x bytes and determine whether to perform segmentation.

For example, when the size of the remaining transmission resource is greater than the certain x bytes, the UE may perform segmentation, configure the RLC header including segmentation information, and configure the corresponding MAC header to fill the transmission resource. When the size of the remaining transmission resource is less than the certain x bytes, the UE may perform padding without performing segmentation. Performing the padding means that the segmentation is not performed on the transmission resource allocated to the logical channel and data is no longer filled.

Also, when data for the logical channel is filled in the MAC PDU and the transmission resource remains, the UE may fill the padding with the padding header (when the remaining space for padding is 1 byte) or the padding header and the padding bits (when the remaining space is 2 bytes or more) at the end.

That is, in a case in which 100 bytes are allocated to the logical channel and, when the data is filled without segmentation, 90 bytes are filled, when the certain x bytes are set to 15 bytes, the UE may not perform segmentation. Instead of performing the segmentation, the UE may configure the MAC PDU with data for 90 bytes with respect to the logical channel, without filling the data for the remaining 10 bytes.

The remaining 10 bytes may be used to fill data in other logical channels, and when it is unnecessary to fill data in other logical channels, the UE may perform padding after filling data of all the logical channels in the MAC PDU.

The certain x bytes may be determined according to implementation. The certain x bytes may be set considering the size of the PDCP header, the size of the RLC header, or the size of the MAC header. That is, the certain x bytes may be set to a value greater than or equal to the size of the entire header. A procedure for setting the certain x bytes, according to an embodiment, may prevent unnecessary transmission of the header and waste of the transmission resource. Also, the procedure for setting the certain x bytes may prevent unnecessary processing and increase the possibility of utilizing the remaining transmission resource.

The above-described method of determining whether to perform the padding and the segmentation, according to the embodiment, may be described as a series of operations as follows. However, this is only an example, and some of the series of operations may be omitted or another operation may be added to determine whether to perform padding and segmentation according to the embodiment.

1. Performing LCP procedure
2. Allocating transmission resource to each logical channel
3. Filling header and data according to allocated transmission resource, without performing segmentation in each logical channel
4. When segmentation is required due to insufficient transmission resources, comparing set certain x bytes with remaining transmission resource, without performing segmentation
5-1. When remaining transmission resource is greater than certain x bytes, performing segmentation, configuring corresponding segmentation information in RLC header, and configuring corresponding MAC header to fill remaining transmission resource.
5-2. When remaining transmission resource is less than certain x bytes, performing no segmentation, filling no data for remaining transmission resource, and configuring MAC PDU for header and data configured without segmentation The remaining transmission resource is used to fill the data of all logical channels in the MAC PDU and then perform padding or fill the data in other logical channels.

As described above, the UE according to the embodiment does not perform segmentation when the size of the remaining transmission resource is less than the certain size (x bytes). Therefore, it may be possible to prevent a case in which, when the certain size is less than or equal to (or slightly greater than) the total sum or partial sum of the PDCP header, the RLC header, or the MAC sub-headers, actual data is not included in the transmission resource and only the headers are added.

The UE according to the embodiment may configure data so as to speed up data processing by reducing the number of segmentations and increase transmission resource efficiency by minimizing padding. The UE may process non-segmented data and segmented data separately and may also process MAC control information separately. Also, the UE may generate the headers of the segmented data by simultaneously performing segmentation while processing non-segmented data, may simultaneously configure and prepare MAC control information, may process segmented data immediately after the processing of the non-segmented data is completed, and may configure MAC control information immediately thereafter. Specifically, when the filling of the MAC PDU with the non-segmented data is completed, the UE may refill the segmented data at the rear of the non-segmented data. When the transmission resource space of the MAC PDU remains at the end, the UE may fill the remaining transmission resource space with the padding header (when the remaining space is 1 byte) or the padding header and the padding bits (when the remaining space is 2 bytes or more).

Figure 14:
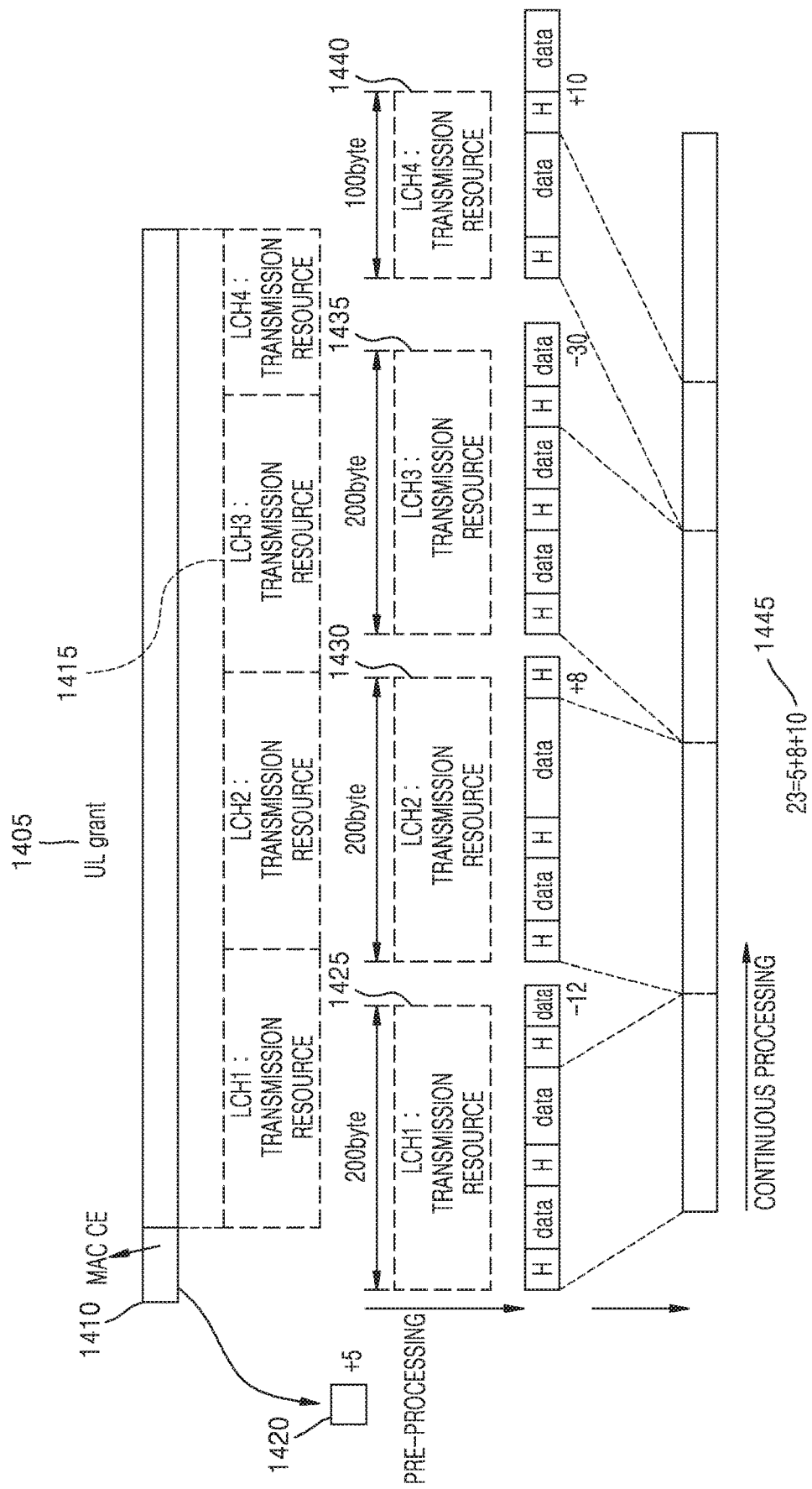
FIGS. 14 and 15 are diagrams for describing a data configuring method according to an embodiment.
Figure 15:
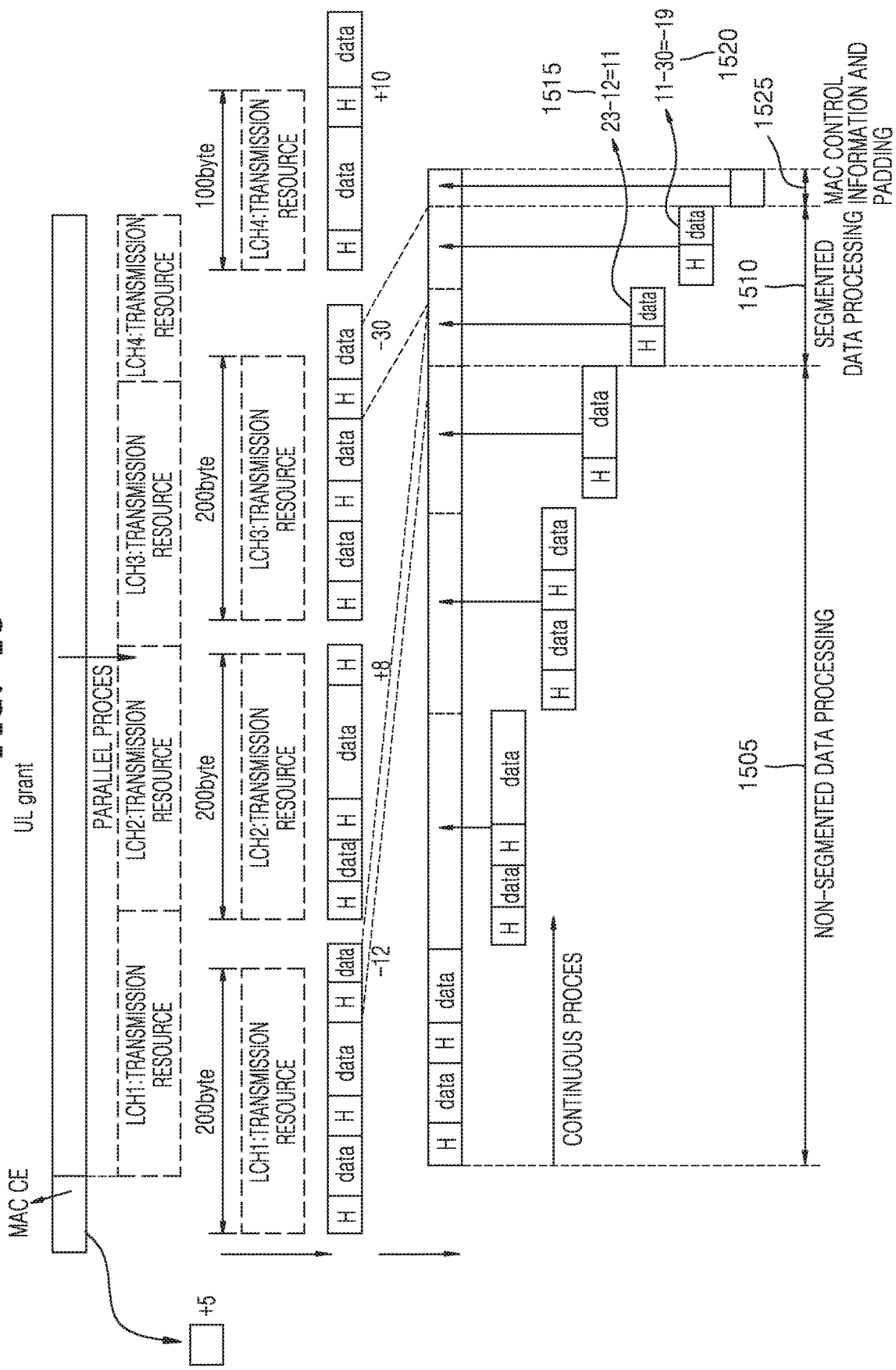

FIGS. 14 and 15 are diagrams for describing a data configuring method according to an embodiment.

Referring to FIG. 14, when the UE receives the uplink transmission resource 1405, the UE may determine whether transmission of MAC control information (MAC CE) is required. When the UE determines that the transmission of the MAC CE is required, the UE may perform the LCP procedure on the uplink transmission resource remaining after excluding the transmission resource size 1410 of MAC CEs to be transmitted from the size of the received uplink transmission resource. As a result of performing the LCP procedure, the transmission resource may be allocated for each logical channel (1415).

When the allocation of the transmission resource for each logical channel is completed, the size of the allocated transmission resource may be compared with the size of data pre-processed data in each logical channel. According to another example, when the data is not pre-processed, the UE may dynamically process the data and generate the header (PDCP header, RLC header, or MAC header). Through the above-described comparison procedure, in each logical channel, data that may be filled in the transmission resource without the necessity of the segmentation may be distinguished from data that requires the segmentation due to the lack of the transmission resource.

The data that does not require the segmentation may configure each header and data as MAC PDUs directly in the RLC layer or the MAC layer.

As described above, each logical channel may compare the size of the distributed transmission resource with the size of the data that each logical channel stores for transmission and distinguish the data that may be filled in the transmission resource without the necessity of segmentation from the data that requires segmentation due to the lack of the transmission resource.

The data that does not require segmentation in each logical channel may directly configure each header and data as the MAC PDU. In this case, which logical channel performs the comparison procedure first and fills the MAC PDU with data may be determined according to implementation. For example, the above-described procedure may be performed first from a logical channel having a high priority according to the priority of each logical channel. According to another example, the above-described procedure may be performed first from a logical channel having a large allocated transmission resource size.

When it is determined that each logical channel requires segmentation, whether to perform segmentation may be determined by comparing the size of the remaining transmission resource with the certain size as described above with reference to FIG. 13, without immediately performing the segmentation. For example, each logical channel may determine whether to perform the segmentation by comparing the certain x bytes (e.g., 10 bytes) with the size of the transmission resource remaining after subtracting the size of the data that may be filled without the necessity of the segmentation from the allocated transmission resource.

When the size of the remaining transmission resource is greater than the certain x bytes (e.g., 10 bytes), each logical channel may determine to perform the segmentation and may calculate how much the transmission resource is insufficient to perform the segmentation. The segmentation is not performed immediately, and only whether the segmentation is required may be determined.

For example, when the size of the remaining transmission resource is 100 bytes and the size of the transmission resource is smaller because the size of the header and data is 130 bytes when being filled without segmentation, the segmentation may be required due to insufficient 30 bytes. Therefore, in this case, the UE may calculate a value for the corresponding logical channel 1425 as −30 bytes. When the size of the remaining transmission resource is less than the certain x bytes (e.g., 10 bytes), the UE may determine not to perform the segmentation and may allow the remaining transmission resource to be used later in other logical channels.

When the transmission resource remains even after all the data to be transmitted are filled in the MAC PDU, the UE may configure the last part of the MAC PDU with padding. For example, when the size of the remaining transmission resource is 8 bytes and is less than the certain x bytes (e.g., 10 bytes), data may not be filled for 8 bytes and the transmission resource may be left so as to be used in other logical channels. Also, the UE may calculate the value of the corresponding logical channel as +8 bytes (1430).

As described above, in each logical channel, the data that may be filled without the necessity of segmentation and the data that requires segmentation may be distinguished, and whether to segment the data that requires segmentation and whether the data is left for use of other logical channels may be calculated. Also, the data that may be filled without segmentation in each logical channel may start to configure the MAC PDU for transmission. In general, the data that may be filled without the necessity of segmentation for one uplink transmission resource occupies most of the total data ratio, and data that requires segmentation is at most one in each logical channel. Therefore, the processing time may be reduced when the data that requires segmentation is processed while the data that does not require segmentation is processed.

After the transmission resource is allocated for each logical channel (1415), when the calculation procedure of each logical channel is ended, the UE may determine whether the size of the MAC control information may be saved. When the size of the MAC control information may be saved, the size of the data that may be saved is calculated. For example, the UE may calculate, as +5 bytes, the value of the size 1420 of the data that may be saved.

In the above-described procedure, the sum 1445 of the remaining transmission resource after calculation for each logical channel and the remaining transmission resource after calculating the MAC control information may be +23 bytes.

Referring to FIG. 15, as described above, the processing 1505 of non-segmented data may be preferentially performed. That is, the MAC PDU may be filled with non-segmented data and headers corresponding thereto. When the non-segmented data of each logical channel is processed, from which logical channels the data is filled in the MAC PDU may be determined according to the implementation. For example, the MAC PDU may be first filled with non-segmented data of a logical channel having a high priority according to the priority of each logical channel. According to another example, non-segmented data of a logical channel having a large allocated transmission resource size may be first filled in the MAC PCU. In this case, as the amount of data to be processed is large, data processing or segmentation of another logical channel or may be performed in parallel.

The UE may perform segmentation of each logical channel and header configuration and preparation of data to be segmented, in parallel, while processing non-segmented data. First, the UE may re-determine whether to perform the segmentation based on positive/negative (+/−) values calculated for each logical channel. The positive value indicates the size of the remaining transmission resource, and the negative value indicates the size of the insufficient transmission resource that allows the segmentation to be performed. In the above-described embodiment, the total remaining transmission resource size is +23 bytes.

The UE starts to allocate the total remaining transmission resource from the logical channel having the smallest absolute value of the negative value among the calculated values of each logical channel based on the total remaining transmission resource. For example, logical channel 1 has a calculated value of −12, and logical 3 has a calculated value of −30. Therefore, the UE may first allocate 23 bytes of the total remaining transmission resource for logical channel 1. Because logical channel 1 has to perform segmentation due to the lack of −12 bytes, the UE may allocate +12 bytes from +23 to logical channel 1 to prevent the segmentation.

That is, in logical channel 1, the segmentation is determined, but the UE may prevent the segmentation with the remaining transmission resource and may configure and fill non-segmented data. Next, the UE may allocate 11 bytes of the remaining transmission resource (23−12=11) 1515 to logical channel 3 having a value of −30. In the case of logical channel 3, the segmentation has to be performed due to the lack of −30 bytes. However, because 11 bytes of the remaining transmission resource are allocated, it may be determined that a total of −19 bytes is insufficient.

Therefore, the UE may determine to perform segmentation on logical channel 3, may perform segmentation on the remaining data except for the last 19 bytes of data, may configure the header for the segmented data (the RLC header is configured to include segmentation information and the MAC header configures the corresponding L field to configure the header). A logical channel having a positive value in logical channels does not perform segmentation on the received uplink transmission resource.

The procedure 1510 of allocating the total remaining transmission resource before performing segmentation, performing segmentation for each logical channel, and configuring each header to configure data may be performed in parallel while the processing 1505 of non-segmented data is performed. The processing 1525 of the MAC control information may also be performed in parallel with non-segmented data processing and segmented data processing.

The data configuring method according to the embodiment, which has described with reference to FIGS. 14 and 15, may be summarized as a series of operations as follows.

1. Receiving uplink transmission resource
2. Receiving uplink transmission resource and determining whether transmission of MAC control information is required
3. Performing LCP procedure for uplink transmission resource size remaining after excluding size of MAC control information to be transmitted
4. Distinguishing data that does not require segmentation from data that requires segmentation for each logical channel, based on transmission resource allocated to each logical channel through LCP procedure, and determining a positive/negative value by comparing size of certain x bytes with size of remaining transmission resource excluding transmission resource for data requiring no segmentation with respect to data requiring segmentation
5. First processing data that does not require segmentation for each logical channel That is, the UE may fill the MAC PDU with data that does not require segmentation for transmission. While performing data processing, the UE may allocate a total sum of the positive values from a logical channel having the smallest absolute value of a −value based on the total sum of positive values in parallel processing to prevent segmentation, and may allocate the transmission resource to logical channels having a negative value until the sum of the positive values is all exhausted. The UE may perform segmentation of each logical channel, configure headers of the segmented data, and prepare to fill the segmented data in the MAC PDU. Also, MAC control information may also be processed in parallel.

6. Configuring MAC PDU in the order of non-segmented data and segmented data.

When necessary, the UE may configure the MAC PDU in the order of segmented data, MAC control information, and padding.

The data configuring method according to the embodiment, which has been described with reference to FIGS. 14 and 15, may reduce the number of segmentations, may accelerate data processing by distinguishing data processing that does not perform segmentation from data processing that requires segmentation for parallel processing, and may minimize padding to increase transmission resource efficiency. The data configuring method described above may be efficient as the number of logical channels increases because there is a higher possibility that the saved transmission resource will increase as the number of logical channels increases.

Figure 16:
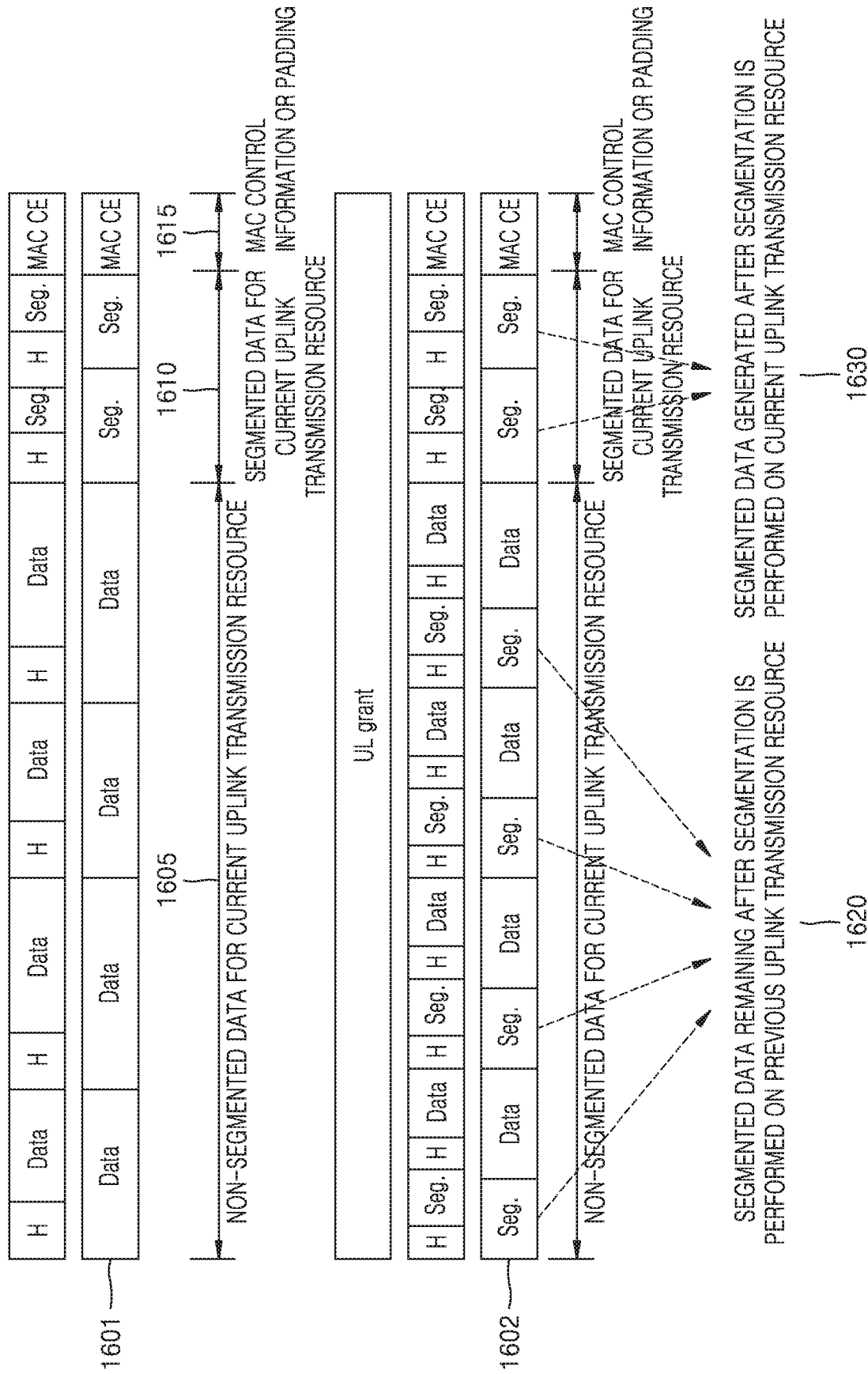
FIG. 16 is a diagram illustrating a pattern of data configuration, according to an embodiment.

FIG. 16 is a diagram illustrating a pattern of data configuration, according to an embodiment.

In a configuration pattern 1601 of MAC PDU illustrated in FIG. 16, non-segmented data among data corresponding to each logical channel may be configured in the front portion, and segmented data may be configured in the rear portion. Also, when transmission of MAC control information is required, the MAC control information may be configured after non-segmented data and segmented data. When the transmission resource remains, padding may be added to the end of the MAC PDU. The pattern of the data configuration described above may be generated by the method described above with reference to FIGS. 14 and 15, but this is only an example. The pattern of the data configuration may be generated by other modified methods.

The MAC PDU structure is advantageous in both the transmitting end and the receiving end in terms of data processing. As described above, the transmitting end may enable pipeline processing and parallel data processing, may reduce the number of segmentations, and may minimize the occurrence of padding. The pipeline processing means that a procedure of processing data directly from the first processed data is continuously repeated in a series of processes.

Also, the receiving end may store data segmented by the RLC layer in a buffer for reassembly, may immediately remove the header from non-segmented data, and may perform data processing and immediately deliver a resulting data to an upper layer. Therefore, in the case of the MAC PDU structure in which non-segmented data is located in the front portion and segmented data is located in the rear portion, the receiving RLC layer first processes the non-segmented data capable of being immediately processed and transmitted to the upper layer, and then processes segmented data to be stored in the buffer, thereby reducing data processing delay in the receiving side. That is, because the RLC layer of the receiving end may quickly deliver feedback packets such as TCP ACK to the upper layer, it is possible to prevent the data transmission window size from being reduced in a TCP/IP layer, thereby preventing a decrease in throughput. In the above-described embodiment, RLC serial numbers may be assigned so that non-segmented data has a lower RLC serial number than segmented data.

Also, in order to configure the MAC PDU structure in which non-segmented data is located in the front portion and segmented data is located in the rear portion, various modified implementation methods as well as the data configuring method described with reference to FIGS. 14 and 15 may be used. In the present embodiment, a MAC PDU structure 1601 capable of improving the data processing speeds of the transmitting end and the receiving end is proposed.

The proposed MAC PDU structure may be used when the base station transmits it to the UE. That is, the base station may configure the structure as described above so as to increase the processing speed of the received data of the UE, and transmit the data to the UE through a downlink.

In the embodiment described herein, the non-segmented data indicates that the segmentation has not been performed to fill data with respect to the currently received uplink transmission resource. That is, the segmentation is performed while filling data in the previous uplink transmission resource, the remaining segmented data that is not transmitted to the previous uplink transmission resource may be classified into data on which segmentation is not performed or non-segmented data with respect to the next uplink transmission resource. Therefore, more specifically, the pattern 1601 of the MAC PDU described above may have a structure 1602.

That is, the UE may perform segmentation to fill data with respect to the previous uplink transmission resource. In this case, the remaining segmented data that is not transmitted in the previous uplink transmission resource may be classified into data on which segmentation is not performed with respect to the current uplink transmission resource. This is because segmentation may not be required for the current uplink transmission resource. Therefore, as indicated by reference numeral 1620, the non-segmented data may include segmented data in which the segmentation is performed on the previous uplink transmission resource.

The remaining segmented data that is not transmitted in the previous uplink transmission resource may or may not exist for each logical channel according to the data processing for the previous uplink transmission resource.

Therefore, the data (MAC PDU) structure may have a structure including already segmented data of a certain logical channel (may or may not exist), non-segmented data, already segmented data of a certain logical channel (may or may not exist), non-segmented data, non-segmented data of a certain logical channel (may or may not exist), non-segmented data, segmented data of a certain logical channel (for a current uplink transmission resource), segmented data of a certain logical channel (for a current uplink transmission resource), segmented data of a certain logical channel (for a current uplink transmission resource), MAC control information, and padding.

As in reference numeral 1601 described above, the data (MAC PDU) structure is also advantageous in both the transmitting end and the receiving end in terms of data processing.

The procedure for performing data pre-processing proposed and described in the present disclosure may be applied as follows. Also, the following data pre-processing method may be applied to a buffer status reporting method, a method of determining whether to perform segmentation, and a data configuring method, which are proposed in the present disclosure.

First embodiment of data pre-processing: Each PDCP layer may cipher PDCP SDU (IP packet or data packet), perform integrity protection when necessary, generate the PDCP header, assign the RLC serial number in each RLC layer, configure a segmentation information (SI) field, and configure the RLC header, thereby completing data pre-processing. When the MAC layer satisfies a certain condition and indicates each RLC layer, the L (length) field may be configured according to the size of the RLC PDU so that the RLC PDU data-pre-processed in each RLC layer is processed in the MAC layer, configure the logical channel identifier (LCID) for each RLC layer, configure the MAC header, and configure and multiplex each MAC sub-header and MAC SDU to configure the MAC PDU according to the size of the uplink transmission resource. The certain condition of the MAC layer may be a case in which the uplink transmission resource is received from the base station. When the uplink transmission resource is received, each RLC layer may be indicated to transmit data-pre-processed RLC PDUs to the MAC layer.

Second embodiment of data pre-processing: In the second embodiment of the data pre-processing, when performing the first embodiment of the data pre-processing, each PDCP header and each RLC header may be separately generated, stored, and managed. That is, when performing data pre-processing, the UE may previously generate, process, and store each PDCP header and each RLC header. After receiving the uplink transmission resource, when segmentation has to be performed due to the lack of transmission resource, the UE may updates the SI field of the generated RLC header (01 is set when it is the first segment, 10 is set when it is the last segment, and 11 is set when it is not both the first segment and the last segment) and dynamically add the SO field to the RLC header when necessary. For example, when the it is not the first segment, the UE may add a segment offset (SO) field having a size of 2 bytes and indicate an offset.

Third embodiment of data pre-processing: In the third embodiment of data pre-processing, the first embodiment of the data pre-processing is performed, but before the uplink transmission resource is received, the UE may perform up to data processing of the MAC layer in advance. In this case, the UE may separately generate, store, and manage each PDCP header, each RLC header, and each MAC header. That is, when performing data pre-processing, the UE may previously generate, separately process, and store each PDCP header, each RLC header, and each MAC header. After receiving the uplink transmission resource, when segmentation has to be performed due to the lack of transmission resource, the UE may updates the SI field of the generated RLC header (01 is set when it is the first segment, 10 is set when it is the last segment, and 11 is set when it is not both the first segment and the last segment) and dynamically add the SO field to the RLC header when necessary. For example, when the it is not the first segment, the UE may add an SO field having a size of 2 bytes and indicate an offset.

Figure 17:
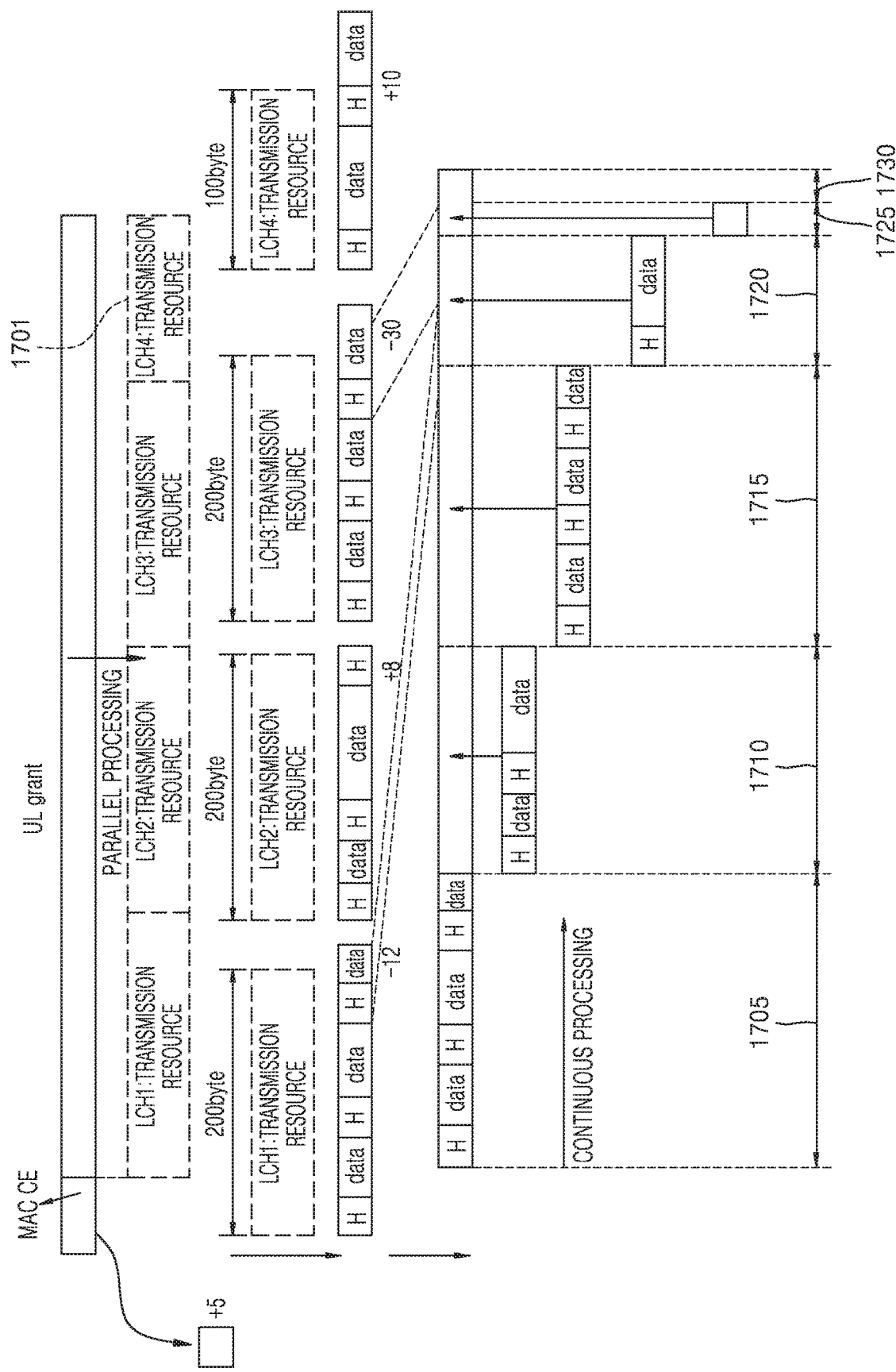
FIG. 17 is a diagram for describing a data processing method for data configuration, according to another embodiment.

FIG. 17 is a diagram for describing a data processing method for data configuration, according to another embodiment.

Referring to FIG. 17, when the UE receives the uplink transmission resource, the UE may determine whether transmission of MAC control information (MAC CE) is required. When the transmission of the MAC CE is required, the UE may perform the LCP procedure on the uplink transmission resource remaining after excluding the transmission resource size of MAC CEs to be transmitted from the size of the received uplink transmission resource. As a result of performing the LCP procedure, the transmission resource 1701 allocated for each logical channel is as illustrated in FIG. 17.

When the allocation of the transmission resource for each logical channel is completed, the size of the allocated transmission resource may be compared with the size of data pre-processed data in each logical channel. According to another example, when the data is not pre-processed, each logical channel may dynamically process the data and generate the header (PDCP header, RLC header, or MAC header).

By comparing the size of the allocated transmission resource with the pre-processed data, each logical channel may distinguish data that may be filled in the transmission resource without the necessity of segmentation from data that requires segmentation due to the lack of transmission resource. The RLC layer or the MAC layer may fill the MAC PDU with data that do not require segmentation and their headers.

When it is determined that each logical channel requires segmentation, whether to perform segmentation may be determined by comparing the size of the remaining transmission resource with the certain size as described above with reference to FIG. 13, without immediately performing the segmentation. For example, each logical channel may determine whether to perform the segmentation by comparing the certain x bytes (e.g., 10 bytes) with the size of the transmission resource remaining after subtracting the size of the data that may be filled without the necessity of the segmentation from the allocated transmission resource.

Each logical channel may determine to perform segmentation when the size of the remaining transmission resource is greater than the certain x bytes (e.g., 10 bytes), perform the segmentation immediately, include segmentation information in the RLC header, and configure the corresponding MAC header. According to another example, each logical channel may determine not to perform segmentation when the size of the remaining transmission resource is less than the certain x bytes (e.g., 10 bytes), and may determine padding without filling data with respect to the remaining transmission resource. The padding may be filled in the last portion when the transmission resource remains even when all the data to be transmitted is filled in the MAC PDU.

In the present embodiment, the operation performed for each logical channel may be summarized as a series of operations as follows.

1. After the LCP procedure is performed, the transmission resource is allocated to the UE for each logical channel.

2. The UE distinguishes data that does not require segmentation from data that requires segmentation for each logical channel, based on transmission resource allocated to each logical channel, and determines whether to perform segmentation and padding by comparing size of certain x bytes with size of remaining transmission resource excluding transmission resource for data requiring no segmentation with respect to data requiring segmentation 3. The UE first processes data that does not require segmentation of each logical channel That is, the UE may start to fill the MAC PDU with the data for transmission. When the segmentation is required, the UE may perform the segmentation while performing data processing, configure headers of the segmented data, and prepare to fill the configured header and data in the MAC PDU. When data that do not require segmentation are filled in the MAC PDU, the prepared segmented data may be filled in the MAC PDU. When it is determined not to perform segmentation, additional processing may not be performed on the data. The UE may attempt to perform transmission when the next uplink transmission resource is received.

In the above-described embodiment, the series of processes proposed above may be applied for each logical channel to simultaneously perform data processing in parallel. As illustrated in FIG. 17, MAC PDU data may be configured as that data are continuous for each logical channel. That is, the UE may configure data 1705 corresponding to logical channel 1, data 1710 corresponding to logical channel 2, data 1715 corresponding to logical channel 3, and data 1720 corresponding to logical channel 4.

When the data of each logical channel is processed, from which logical channels the data is filled in the MAC PDU may be determined according to the implementation. For example, the MAC PDU may be first filled with data of a logical channel having a high priority in according to the priority of each logical channel. According to another example, the MAC PDU may be first filled with data of a logical channel having a large allocated transmission resource size. In this case, as the amount of data to be processed is large, data processing or segmentation of another logical channel or may be performed in parallel.

Also, MAC control information may be configured after data of logical channels when transmission is required. When there is the saved transmission resource portion, the corresponding portion may be configured with padding 1730. In this case, transmission resources are saved, but the transmission resource efficiency may not be increased by processing with padding. However, because independent data processing is performed for each logical channel, processing time may be reduced. By processing the padding, a procedure for configuring or reading unnecessary headers may be omitted in the transmitting end and the receiving end.

Figure 18:
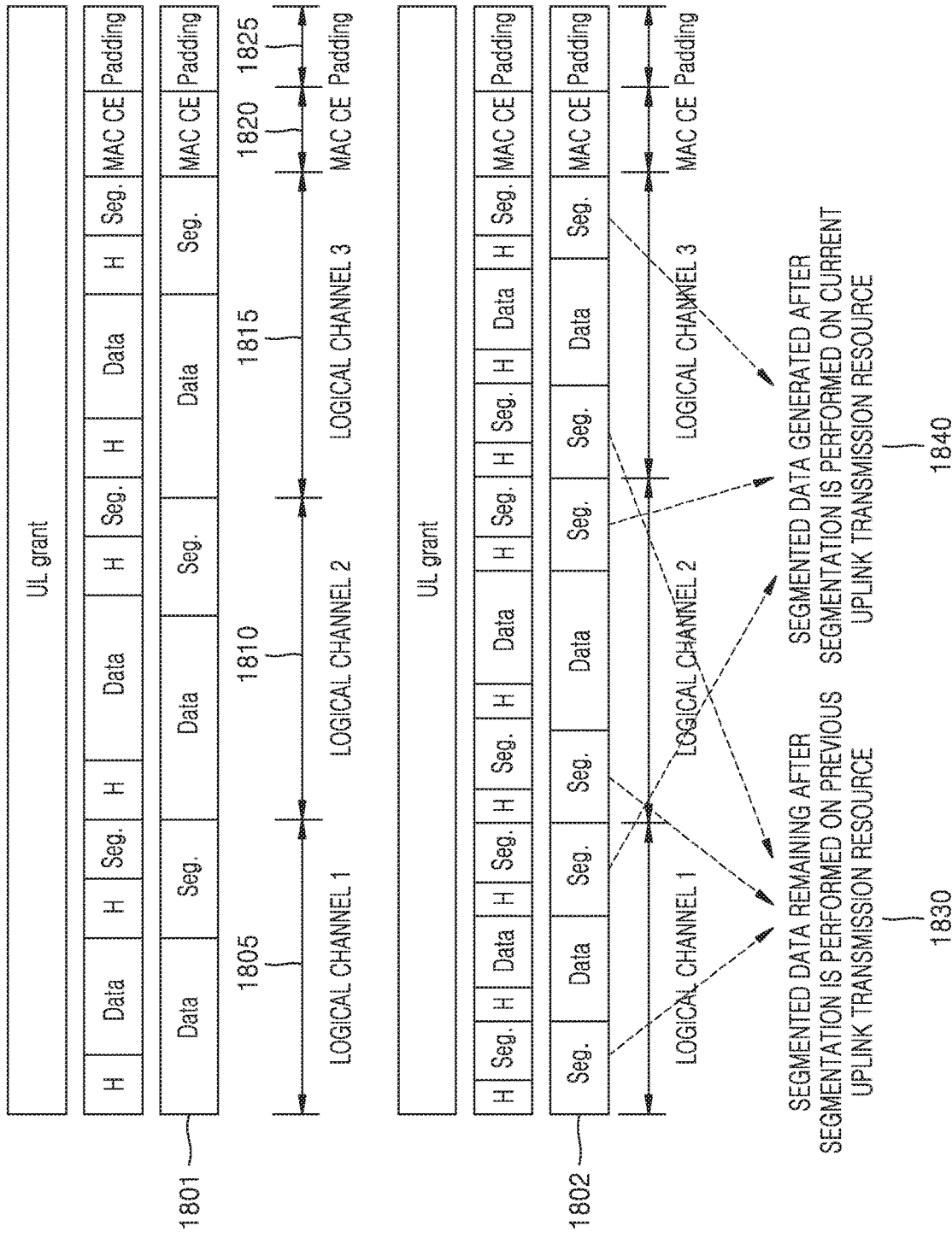
FIG. 18 is a diagram for describing a pattern of data configuration, according to another embodiment.

FIG. 18 is a diagram for describing a pattern of data configuration, according to another embodiment.

In a configuration pattern 1801 of MAC PDU illustrated in FIG. 18, non-segmented data and segmented data are continuously configured in each logical channel. For example, data may be configured in the order of RLC serial numbers in each logical channel. That is, the configuration pattern 1801 of the MAC PDU according to the embodiment may have a data structure grouped in units of logical channels. When the data of the MAC PDU is configured in units of logical channels, data processing of each logical channel may be independently performed.

Therefore, because the data processing of one logical channel does not affect the data processing of another logical channel, parallel processing may be enabled and data processing time may be reduced. Also, the receiving end has an advantage in that data may be divided in units of logical channels and sequentially processed. Also, when each logical channel operates in an AM mode on the RLC layer, consecutive lost data when performing RLC status reporting may be efficiently reported by using a NACK_SN field.

Also, when transmission of MAC control information is required, the MAC control information may be configured after data of logical channels. When the transmission resource remains, padding may be added to the end of the MAC PDU. The pattern of the data configuration described above may be generated by the method described above with reference to FIG. 16, but this is only an example. The pattern of the data configuration may be generated by other modified methods.

In the embodiment described herein, the non-segmented data indicates that the segmentation has not been performed to fill data with respect to the currently received uplink transmission resource. That is, the segmentation is performed while filling data in the previous uplink transmission resource, the remaining segmented data that is not transmitted to the previous uplink transmission resource may be classified into data on which segmentation is not performed or non-segmented data with respect to the next uplink transmission resource. Therefore, more specifically, the pattern 1801 of the MAC PDU described above may have a structure 1802.

That is, the UE may perform segmentation to fill data with respect to the previous uplink transmission resource. In this case, the remaining segmented data that is not transmitted in the previous uplink transmission resource may be classified into data on which segmentation is not performed with respect to the current uplink transmission resource. This is because segmentation may not be required for the current uplink transmission resource. Therefore, the non-segmented data 1830 may include segmented data with respect to the previous uplink transmission resource.

The remaining segmented data that is not transmitted in the previous uplink transmission resource may or may not exist for each logical channel according to the data processing for the previous uplink transmission resource.

Therefore, the data (MAC PDU) structure may have a structure including already segmented data of a certain logical channel (may or may not exist), non-segmented data, segmented data+already segmented data of a certain logical channel (may or may not exist), non-segmented data, segmented data+already segmented data of a certain logical channel (may or may not exist), non-segmented data, and segmented data+MAC control information+padding. As in reference numeral 1801 described above, the data (MAC PDU) structure is also advantageous in both the transmitting end and the receiving end in terms of data processing.

Figure 19:
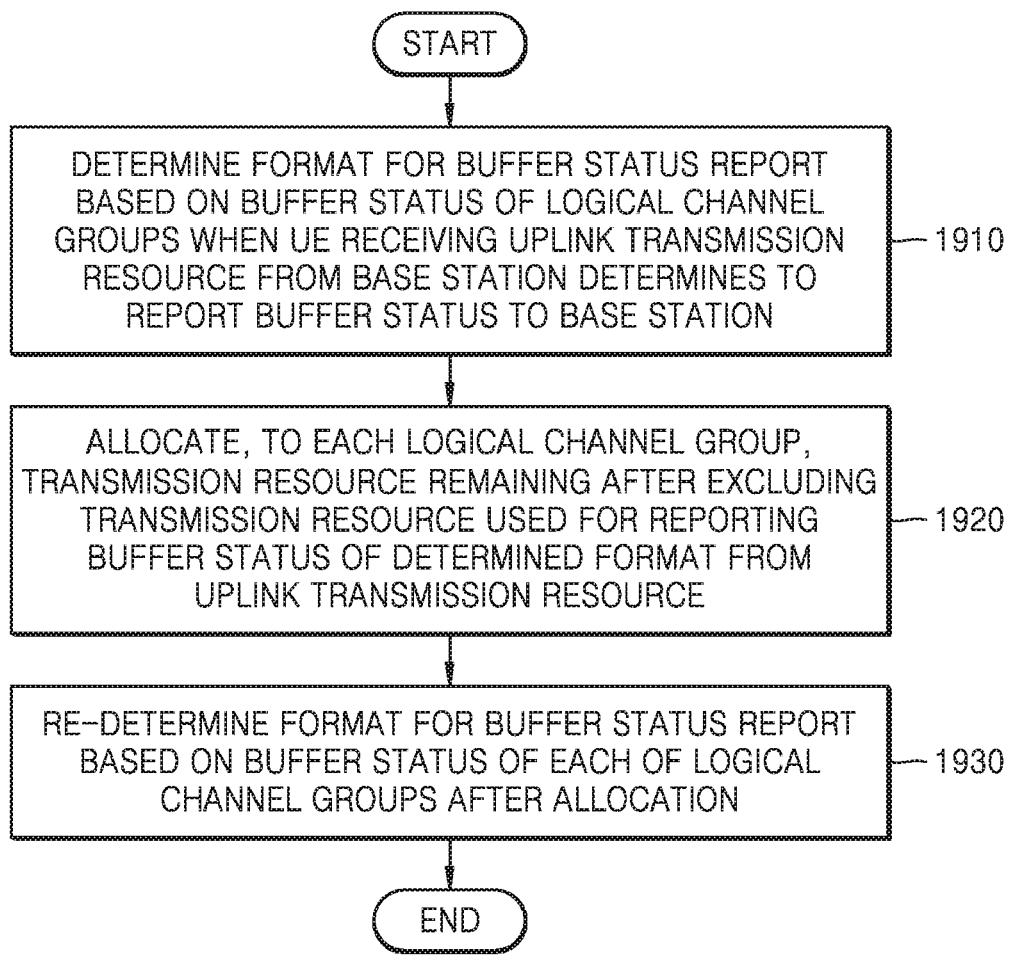
FIG. 19 is a flowchart for describing a data processing method according to an embodiment.

FIG. 19 is a flowchart of a data processing method according to an embodiment.

In operation 1910, the UE may receive the uplink transmission resource from the base station, and as it is determined to report the buffer status to the base station, the UE may determine the format for buffer status report based on the buffer status of each of the logical channel groups.

In operation 1920, the UE may allocate, to each logical channel group, the transmission resource remaining after excluding the transmission resource used for reporting the buffer status of the determined format from the uplink transmission resource.

Buffer status reporting according to an embodiment may be performed through MAC CE. The UE may exclude a transmission resource for transmission of MAC CE having a high priority from the uplink transmission resource and allocate the resulting transmission resource to each logical channel group. In this case, data exceeding the allocated transmission resource may remain in the buffer of the logical channel group.

In operation 1930, the UE may re-determine the format for buffer status report based on the buffer status of each of the logical channel groups after allocation. The UE according to the embodiment may change the format determined in operation 1910 according to the amount of data for each remaining logical channel group. This may correspond to an operation of re-determining the BSR format described above with reference to FIG. 11.

Figure 20:
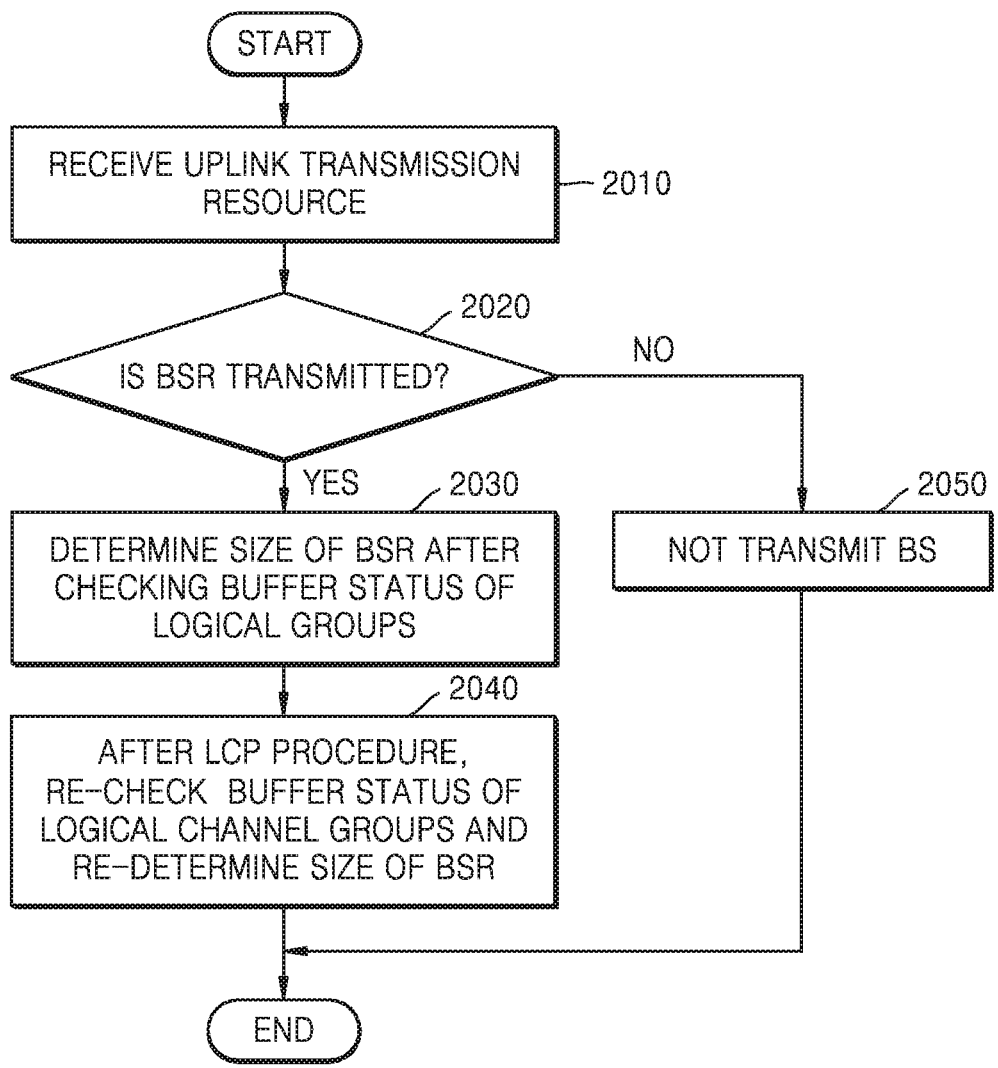
FIG. 20 is a flowchart for describing a method of re-determining a BSR format, according to an embodiment.

FIG. 20 is a flowchart for describing a method of re-determining a BSR format, according to an embodiment.

In operation 2010, the UE may receive an uplink transmission resource.

In operation 2020, the UE may determine whether to transmit BSR through MAC CE.

In operation 2030, when the UE determines to transmit the BSR, the UE may check the buffer status of the current logical channel groups and determine the size of the BSR according to the checked buffer status. Also, the UE may subtract the determined size of the BSR from the uplink transmission resource and perform an LCP procedure on the remaining transmission resource.

In operation 2040, after the LCP procedure, the UE may re-check the buffer status of each logical channel group and re-determine the size of the BSR. The UE according to the embodiment may configure each field according to the determined short BSR format or long BSR format and configure data by including the BSR as the MAC CE at the end of the MAC PDU.

In operation 2050, when the UE determines not to transmit the BSR, the UE may not transmit the BSR to the base station.

Figure 21:
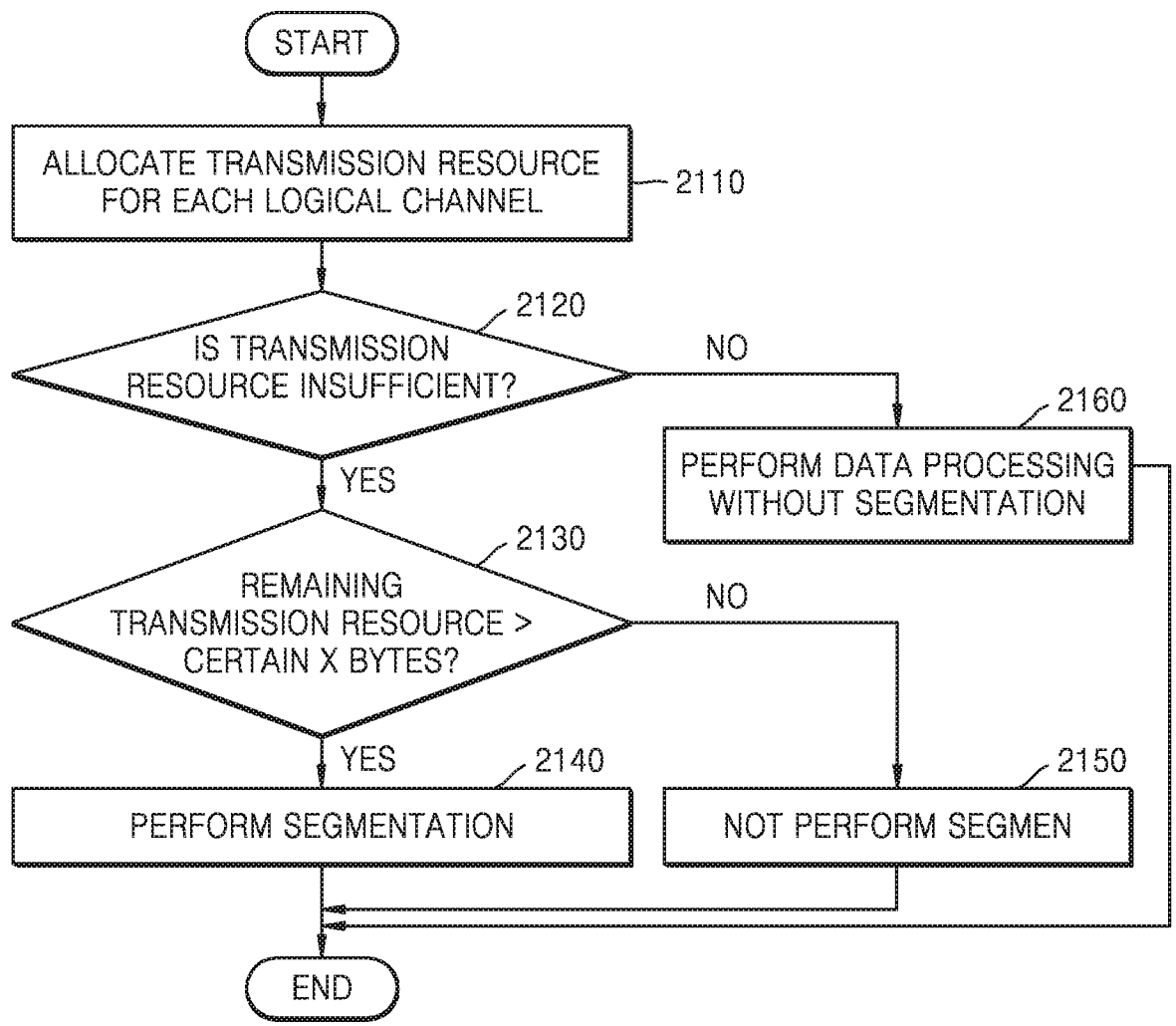
FIG. 21 is a flowchart for describing a method of determining whether to segment data, according to an embodiment.

FIG. 21 is a flowchart for describing a method of determining whether to segment data, according to an embodiment.

In operation 2110, the UE may perform the LCP procedure to allocate the transmission resource for each logical channel. The transmission resource may be allocated to each logical channel according to the LCP procedure. In each logical channel, the segmentation is not performed, and headers and data may be filled according to the allocated transmission resource.

In operation 2120, the UE may check the size of the allocated transmission resource to determine whether the transmission resource is insufficient.

In operation 2130, when it is determined that the transmission resource is insufficient, the UE may compare the remaining transmission resource with certain x bytes.

In operation 2140, when the remaining transmission resource is greater than the certain x bytes, the UE may perform segmentation. Also, the UE may fill the remaining transmission resource by configuring segmentation information corresponding to the segmentation in the RLC header and configuring the corresponding MAC header.

In operation 2150, when the remaining transmission resource is less than or equal to the certain x bytes, the UE may not perform segmentation. In addition, the UE no longer fills the data for the remaining transmission resource and uses the header and data configured without segmentation to configure the MAC PDU in the MAC layer. The remaining transmission resource is used to fill the data of all logical channels in the MAC PDU and then perform padding or fill the data in other logical channels.

Figure 22:
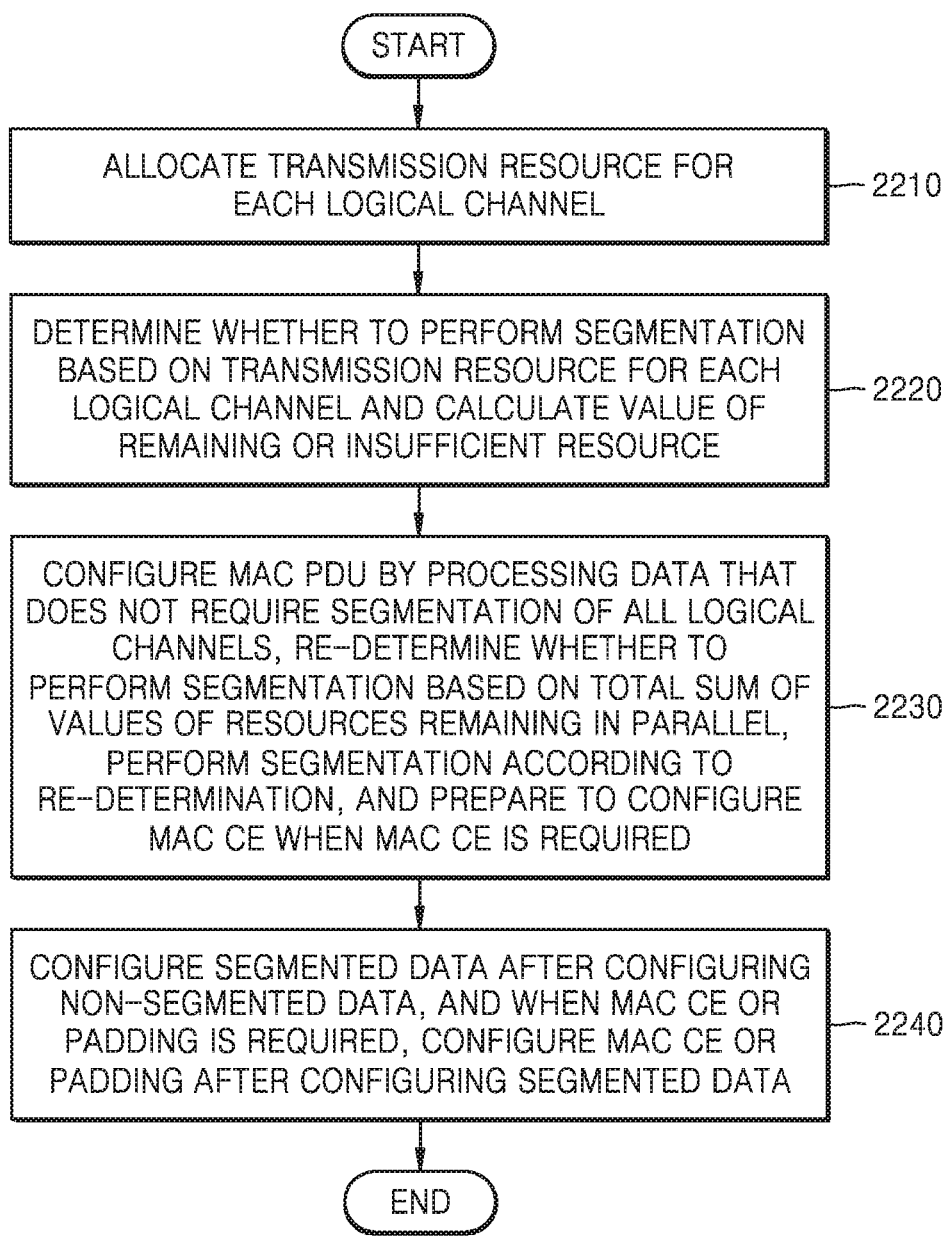
FIG. 22 is a flowchart for describing a method, performed by a UE, of configuring data, according to an embodiment.

FIG. 22 is a flowchart for describing a method, performed by a UE, of configuring data, according to an embodiment.

In operation 2210, the UE may allocate the transmission resource for each logical channel. When the UE receives the uplink transmission resource, the UE may perform an LCP procedure on the size of the uplink transmission resource remaining after excluding the size of MAC control information to be preferentially transmitted.

In operation 2220, the UE may determine whether to perform segmentation based on the transmission resource for each logical channel and calculate the value of the remaining or insufficient resource. The UE may distinguish data that does not require segmentation from data that requires segmentation for each logical channel based on the transmission resource allocated to each logical channel through the LCP procedure.

The UE may determine a positive/negative value with respect to data that requires segmentation by comparing the size of the certain x bytes with the size of the transmission resource remaining after excluding the transmission resource for data that does not require segmentation. The positive value indicates the size of the remaining transmission resource, and the negative value indicates the size of the insufficient transmission resource. When the size of the remaining transmission resource is less than the certain x bytes, the UE may calculate the size of the remaining transmission resource as the positive value. When the size of the remaining transmission resource is greater than the certain x bytes, the UE may calculate the size of the insufficient transmission resource as the negative value.

In operation 2230, the UE may configure the MAC PDU by first processing data that does not require the segmentation of each logical channel, re-determine whether to perform segmentation based on the total sum of the values of resources remaining in parallel and the total sum of the insufficient resource values, perform the segmentation according to the re-determination, and configure the MAC CE when the MAC CE is required.

That is, the UE may fill the MAC PDU with non-segmented data for transmission. The UE may allocate the total sum of the positive values from the logical channel having the lowest absolute value of the negative value based on the total sum of the positive values through parallel processing while performing the processing of non-segmented data, thereby preventing segmentation. The UE may allocate the transmission resource to logical channels having a negative value until the sum of the positive values is exhausted. Also, the UE may perform segmentation of each logical channel in parallel, configure headers of the segmented data, and prepare to fill the segmented data in the MAC PDU. Also, the UE may configure MAC CE through parallel processing.

In operation 2240, the UE may configure segmented data after configuring non-segmented data, and when MAC CE or padding is required, the UE may configure MAC CE or padding after configuring segmented data.

When configuring the MAC PDU to be transmitted, the UE according to the embodiment may first configure non-segmented data and then configure segmented data. Also, when the MAC CE or padding is required, the UE may configure MAC PDUs in the order of segmented data, MAC CE, and padding.

Figure 23:
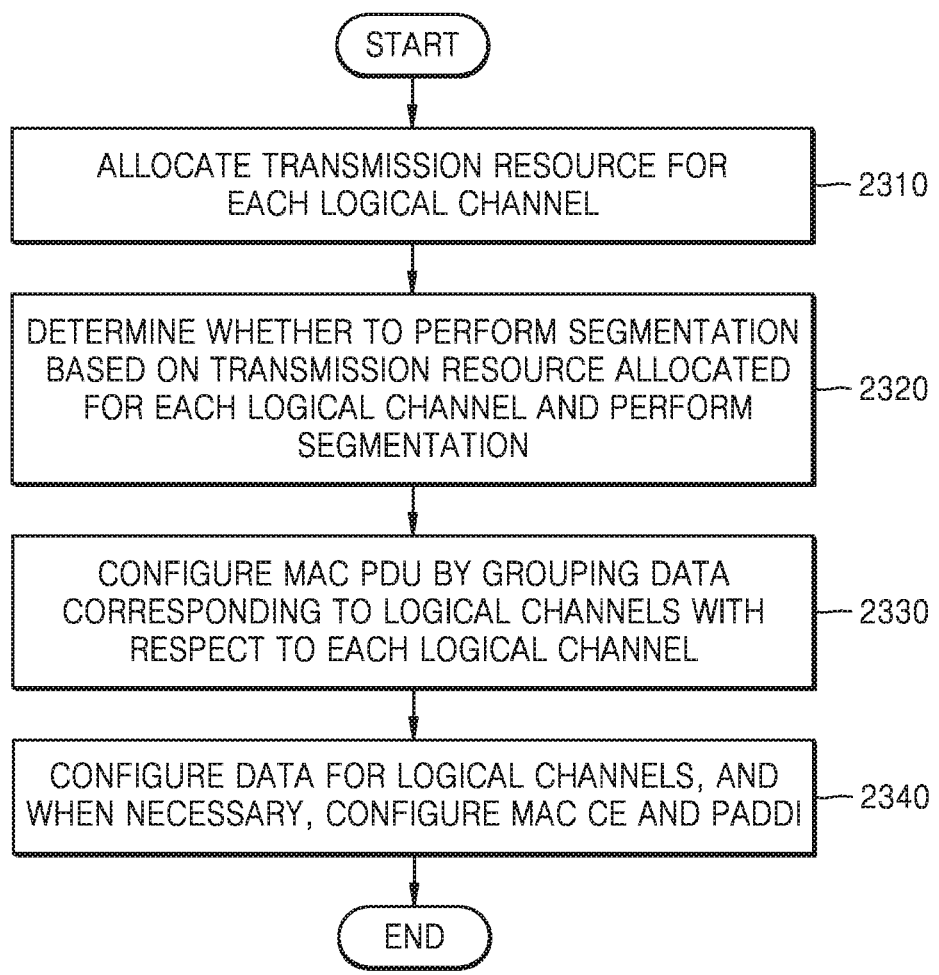
FIG. 23 is a flowchart for describing a method, performed by a UE, of configuring data, according to another embodiment.

FIG. 23 is a flowchart for describing a method, performed by a UE, of configuring data, according to another embodiment.

In operation 2310, the UE may perform the LCP procedure to allocate the transmission resource for each logical channel.

In operation 2320, the UE may determine whether to perform segmentation based on the transmission resource allocated for each logical channel and perform segmentation according to a result of the determining.

The UE according to the embodiment may distinguish data that does not require segmentation from data that requires segmentation for each logical channel. The UE may determine whether to perform segmentation and whether to perform padding with respect to data that requires segmentation by comparing the size of the certain x bytes with the size of the transmission resource remaining after excluding the transmission resource for data that does not require segmentation.

In operation 2330, the UE may configure the MAC PDU by grouping data corresponding to the logical channels with respect to each logical channel.

The UE may first process data that does not require segmentation of each logical channel That is, the UE may fill the MAC PDU with data that does not require segmentation for transmission. When the segmentation is required, the UE may perform the segmentation while performing data processing, configure headers of the segmented data, and prepare to fill the configured header and data in the MAC PDU. When data that does not require segmentation is configured in the MAC PDU, the UE may configure the segmented data in the MAC PDU. When the UE determines not to perform segmentation, the UE may not perform additional processing on the data. In this regard, the UE may attempt to perform transmission when the next uplink transmission resource is received.

In operation 2340, the UE may configure data so as to be continuously included in the MAC PDU for each logical channel, and when necessary, may additionally configure MAC CE and padding.

Figure 24:
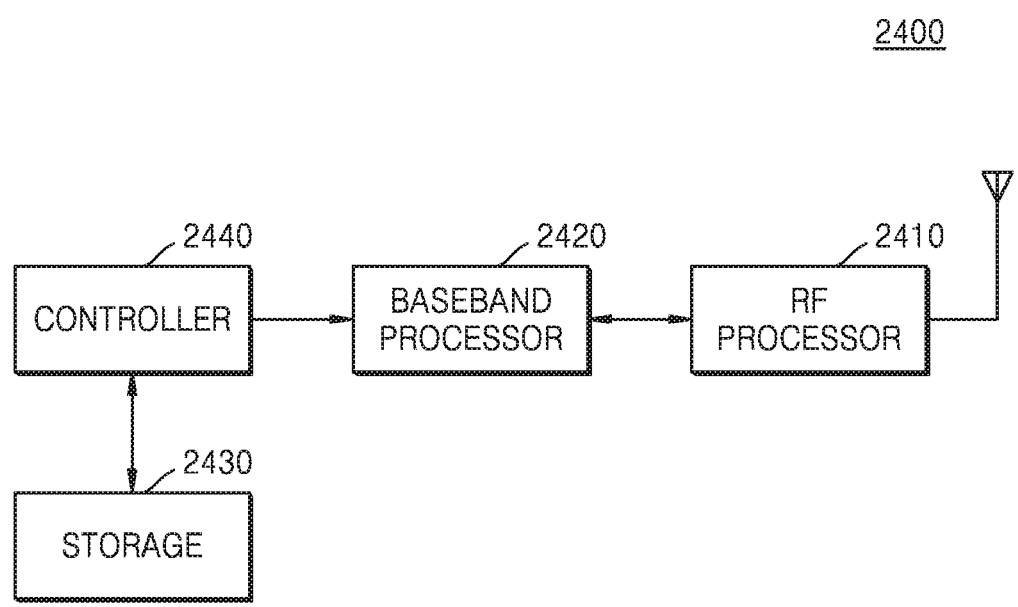
FIG. 24 is a block diagram of a UE according to an embodiment.

FIG. 24 is a block diagram of a UE 2400 according to an embodiment.

Referring to FIG. 24, the UE 2400 may include a radio frequency (RF) processor 2410, a baseband processor 2420, a storage 2430, and a controller 2440.

The RF processor 2410 may perform a function of transmitting and receiving signals through a radio channel, such as band conversion and amplification of signals. That is, the RF processor 2410 may up-convert a baseband signal provided from the baseband processor 2420 into an RF band signal and transmit the RF band signal through an antenna, and may down-convert an RF band signal received through an antenna into a baseband signal. For example, the RF processor 2410 may include a transmission filter, a reception filter, an amplifier, a mixer, an oscillator, a digital-to-analog converter (DAC), an analog-to-digital converter (ADC), and the like. Also, although only one antenna is illustrated in FIG. 24, the UE 2400 may include a plurality of antennas. Also, the RF processor 2410 may include a plurality of RF chains. Furthermore, the RF processor 2410 may perform beamforming. For beamforming, the RF processor 2410 may adjust the phases and magnitudes of signals transmitted and received through a plurality of antennas or antenna elements. Also, the RF processor 2410 may perform MIMO and may receive a plurality of layers when performing the MIMO. The RF processor 2410 may perform RX beam sweeping by appropriately setting a plurality of antennas or antenna elements under the control of the controller 2440, or may adjust the direction and beam width of the reception beam so that the reception beam is cooperated with transmission beam.

The baseband processor 2420 may perform a conversion function between a baseband signal and a bit string according to a physical layer standard of a system. For example, upon transmission of data, the baseband processor 2420 may encode and modulate a transmission bit string to generate complex symbols. Also, upon reception of data, the baseband processor 2420 may restore the reception bit string by demodulating and decoding the baseband signal provided from the RF processor 2410. For example, in the case of conforming to the OFDM scheme, upon transmission of data, the baseband processor 2420 may encode and modulate the transmission bit string to generate complex symbols, map the complex symbols to sub-carriers, and configure OFDM symbols through an inverse fast Fourier transform (IFFT) operation and cyclic prefix (CP) insertion. Also, upon reception of data, the baseband processor 2420 may segment the baseband signal provided from the RF processor 2410 into OFDM symbol units, reconstruct signals mapped to sub-carriers through a fast Fourier transform (FFT) operation, and reconstruct a reception bit string through demodulation and decoding.

The baseband processor 2420 and the RF processor 2410 may transmit and receive signals as described above. Therefore, the baseband processor 2420 and the RF processor 2410 may be referred to as a transmitter, a receiver, a transceiver, or a communicator. Furthermore, at least one of the baseband processor 2420 and the RF processor 2410 may include a plurality of communication modules so as to support a plurality of different radio access technologies.

Also, at least one of the baseband processor 2420 and the RF processor 2410 may include different communication modules so as to process signals of different frequency bands. For example, the different radio access technologies may include an LTE network, an NR network, and the like. Also, the different frequency bands may include a super high frequency (SHF) (e.g., 2.5 GHz or 5 Ghz) band and a millimeter wave (e.g., 60 GHz) band.

The storage 2430 may store data such as basic programs, application programs, and configuration information for the operations of the UE described above with reference to FIGS. 1 to 23. The storage 2430 may provide stored data according to the request of the controller 2440.

The controller 2440 may control overall operations of the UE 2400. For example, the controller 2440 may transmit and receive signals through the baseband processor 2420 and the RF processor 2410. Also, the controller 2440 may record data in the storage 2430 and read data from the storage 2430. To this end, the controller 2440 may include at least one processor. For example, the controller 2440 may include a communication processor (CP) that performs a control for communication and an application processor (AP) that controls an upper layer such as an application program.

Figure 25:
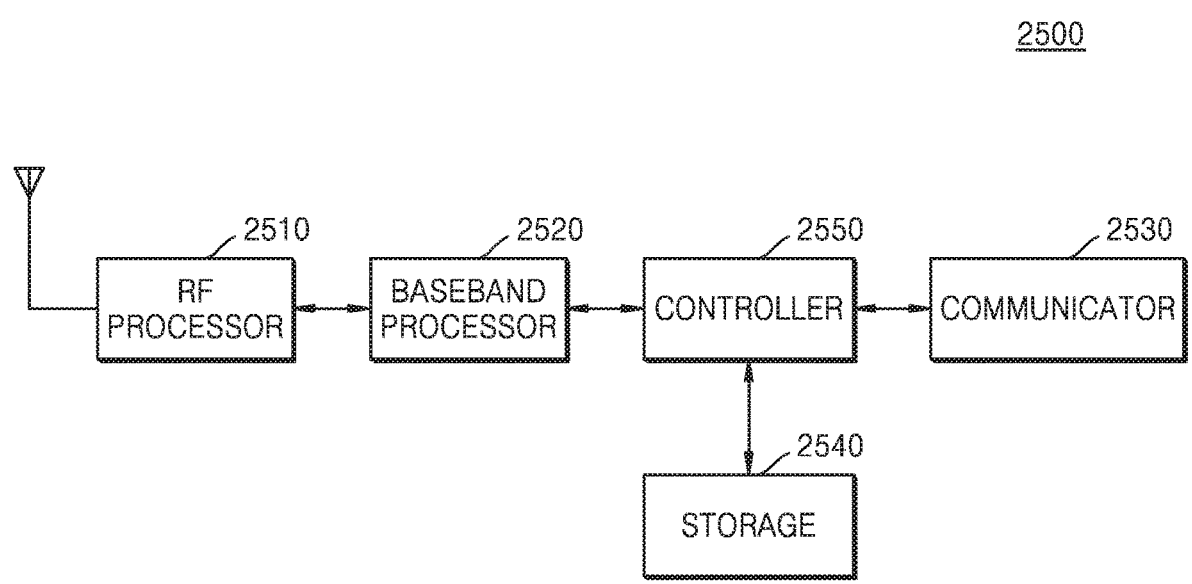
FIG. 25 is a block diagram of a base station according to an embodiment.

FIG. 25 is a block diagram of a base station 2500 according to an embodiment.

As illustrated in FIG. 25, the base station 2500 may include an RF processor 2510, a baseband processor 2520, a backhaul communicator 2530, a storage 2540, and a controller 2550.

The RF processor 2510 may perform a function of transmitting and receiving signals through a radio channel, such as band conversion and amplification of signals. That is, the RF processor 2510 may up-convert a baseband signal provided from the baseband processor 2520 into an RF band signal and transmit the RF band signal through an antenna, and may down-convert an RF band signal received through an antenna into a baseband signal. For example, the RF processor 2510 may include a transmission filter, a reception filter, an amplifier, a mixer, an oscillator, a DAC, an ADC, and the like.

Although only one antenna is illustrated in FIG. 25, the base station 2500 may include a plurality of antennas. Also, the RF processor 2510 may include a plurality of RF chains. Furthermore, the RF processor 2510 may perform beamforming. For beamforming, the RF processor 2510 may adjust the phases and magnitudes of signals transmitted and received through a plurality of antennas or antenna elements. The RF processor 2510 may perform a downlink MIMO operation by transmitting one or more layers.

The baseband processor 2520 may perform a conversion function between a baseband signal and a bit string according to a physical layer standard of a first radio access technology. For example, upon data transmission, the baseband processor 2520 may encode and modulate a transmission bit stream to generate complex symbols. Also, upon reception of data, the baseband processor 2520 may restore the reception bit stream by demodulating and decoding the baseband signal provided from the RF processor 2510.

For example, in the case of conforming to the OFDM scheme, upon transmission of data, the baseband processor 2520 may encode and modulate the transmission bit string to generate complex symbols, map the complex symbols to sub-carriers, and configure OFDM symbols through an IFFT operation and CP insertion. Also, upon reception of data, the baseband processor 2520 may segment the baseband signal provided from the RF processor 2510 into OFDM symbol units, reconstruct signals mapped to sub-carriers through an FFT operation, and reconstruct a reception bit string through demodulation and decoding. The baseband processor 2520 and the RF processor 2510 may transmit and receive signals as described above. Therefore, the baseband processor 2520 and the RF processor 2510 may be referred to as a transmitter, a receiver, a transceiver, a communicator, or a radio communicator.

The communicator 2530 provides an interface for performing communication with other nodes in the network.

The storage 2540 may store data such as basic programs, application programs, and configuration information for the operations described above with reference to FIGS. 1 to 23. Also, the storage 2540 may store information about a bearer allocated to a connected UE, measurement results reported from a connected UE, and the like. Also, the storage 2540 may store information that is a criterion for determining whether to provide or stop multiple access to the UE. The storage 2540 may provide stored data according to the request of the controller 2550.

The controller 2550 may control overall operations of the base station 2500. For example, the controller 2550 may transmit and receive signals through the baseband processor 2520 and the RF processor 2510. Also, the controller 2550 may record data in the storage 2540 and read data from the storage 2540. To this end, the controller 2550 may include at least one processor.

The invention claimed is:

1. A method, performed by a user equipment (UE), of processing data in a wireless communication system, the method comprising:
   in case that a buffer status report is determined to be transmitted via medium access control (MAC) control element (CE), determining a format of the buffer status report based on a buffer status of each of logical channel groups, wherein the format of the buffer status report includes a short buffer status report and a long buffer status report;
   identifying size of transmission resource by excluding a resource size for the determined format of the buffer status report from entire transmission resource granted from a base station;
   allocating the identified transmission resource, to each of the logical channel groups;
   re-determining the format of the buffer status report based on modified buffer status of each of the logical channel groups after the allocation of the identified transmission resource; and
   based on the re-determined format of the buffer status report, obtaining the buffer status report including identification information about a logical channel group in which data remains and information about a size of the remaining data.

2. The method of claim 1, further comprising:
   mapping the transmission resource allocated to each of logical channels, to data of a logical channel without segmentation; and
   in case that a size of the allocated transmission resource is less than a size of the data of the logical channel, determining whether to segment data remaining after the mapping.

3. The method of claim 1, further comprising:
   identifying a size of a remaining resource or insufficient resource, based on a transmission resource allocated for each logical channel and a buffer status of a logical channel;
   mapping the remaining resource data with the insufficient resource;
   determining whether to segment data based on a result of the mapping; and
   generating a MAC packet data unit (PDU) including at least one non-segmented data or segmented data based on the determining.

4. The method of claim 3, wherein, in the MAC PDU, non-segmented data of logical channels are sequentially arranged and segmented data of the logical channels are sequentially arranged.

5. The method of claim 3, wherein, in the MAC PDU, non-segmented data and segmented data of logical channels are sequentially arranged per each logical channel.

6. The method of claim 1, further comprising:
   identifying data mapped to insufficient transmission resources, based on transmission resources allocated for each logical channel and a buffer status of a logical channel;
   determining whether to segment the identified data by comparing the identified data with a preset data size; and
   generating a MAC packet data unit (PDU) including at least one non-segmented data or segmented data based on the determining.

7. A user equipment (UE) for processing data in a wireless communication system, the UE comprising:
   a transceiver; and
   at least one processor coupled to the transceiver and configured to:
      in case that a buffer status report is determined to be transmitted via medium access control (MAC) control element (CE), determine a format of the buffer status report based on a buffer status of each of logical channel groups, wherein the format of the buffer status report includes a short buffer status report and a long buffer status report,
      identify size of transmission resource by excluding a resource size for the determined format of the buffer status report from entire transmission resource granted from a base station,
      allocate, the identified transmission resource to each of the logical channel groups,
      re-determine the format of the buffer status report based on modified buffer status of each of the logical channel groups after the allocation of the identified transmission resource, and
      based on the re-determined format of the buffer status report, obtain the buffer status report including identification information about a logical channel group in which data remains and information about a size of the remaining data.

8. The UE of claim 7, wherein the at least one processor is further configured to:
   map the transmission resource allocated to each of logical channels, to data of a logical channel without segmentation, and
   in case that a size of the allocated transmission resource is less than a size of the data of the logical channel, determine whether to segment data remaining after the mapping.

9. The UE of claim 7, wherein the at least one processor is further configured to:
   identify a size of a remaining resource or insufficient resource based on a transmission resource allocated for each logical channel and a buffer status of a logical channel,
   map the remaining resource data with the insufficient resource, determine whether to segment data based on a result of the mapping, and generate a MAC packet data unit (PDU) including at least one non-segmented data or segmented data based on the determining.

10. The UE of claim 9, wherein, in the MAC PDU, non-segmented data of logical channels are sequentially arranged and segmented data of the logical channels are sequentially arranged.

11. The UE of claim 9, wherein, in the MAC PDU, non-segmented data and segmented data of logical channels are sequentially arranged per each logical channel.

12. The UE of claim 7, wherein the at least one processor is further configured to:

identify data mapped to insufficient transmission resources based on transmission resources allocated for each logical channel and a buffer status of a logical channel, determine whether to segment the identified data by comparing the identified data with a preset data size, and generate a MAC packet data unit (PDU) including at least one non-segmented data or segmented data, based on the determining.

13. A non-transitory computer-readable recording medium having recorded thereon a program, which when executed by at least one processor of a user equipment (UE), causes the at least one processor to:

in case that a buffer status report is determined to be transmitted via medium access control (MAC) control element (CE), determine a format of the buffer status report based on a buffer status of each of logical channel groups, wherein the format of the buffer status report includes a short buffer status report and a long buffer status report;

identify size of transmission resource by excluding a resource size for the determined format of the buffer status report from entire transmission resource granted from a base station;

allocate the identified transmission resource, to each of the logical channel groups;

re-determine the format of the buffer status report based on modified buffer status of each of the logical channel groups after the allocation of the identified transmission resource; and based on the re-determined format of the buffer status report, obtain the buffer status report including identification information about a logical channel group in which data remains and information about a size of the remaining data.

\* \* \* \* \*